US012739809B2

(12) United States Patent
Hu

(10) Patent No.: US 12,739,809 B2
(45) Date of Patent: Sep. 15, 2026

(54) MULTI-CONNECTIVITY COMMUNICATION METHOD AND APPARATUS

(71) Applicant: HUAWEI TECHNOLOGIES CO., LTD., Shenzhen (CN)

(72) Inventor: Xingxing Hu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 292 days.

(21) Appl. No.: 18/603,647

(22) Filed: Mar. 13, 2024

(65) Prior Publication Data

US 2024/0224249 A1 Jul. 4, 2024

Related U.S. Application Data

(63) Continuation of application No. PCT/CN2022/118763, filed on Sep. 14, 2022.

(30) Foreign Application Priority Data

Sep. 16, 2021 (CN) ........................ 202111086156.2

(51) Int. Cl.
*H04W 72/0453* (2023.01)
*H04W 72/50* (2023.01)

(52) U.S. Cl.
CPC ..... *H04W 72/0453* (2013.01); *H04W 72/535* (2023.01)

(58) Field of Classification Search
CPC ........... H04W 72/0453; H04W 72/535; H04W 72/20; H04W 72/27; H04W 76/11; H04W 36/0069; H04W 76/15
See application file for complete search history.

(56) References Cited

U.S. PATENT DOCUMENTS

2018/0049085 A1* 2/2018 Hu .......................... H04W 8/08

FOREIGN PATENT DOCUMENTS

WO 2020113367 A1 6/2020
WO 2021162599 A1 8/2021

OTHER PUBLICATIONS

3GPP TS 38.331, “3rd Generation Partnership Project; Technical Specification Group Radio Access Network; NR; Radio Resource Control (RRC) Protocol Specification (Release 16)”, 3GPP Organizational Partners, Mar. 2021, V16.4.1, 214 pages.

* cited by examiner

*Primary Examiner* — Natasha W Cosme
(74) *Attorney, Agent, or Firm* — Maier & Maier, PLLC

(57) ABSTRACT

A communication method and an apparatus can include a master node determines a first secondary node and a second secondary node; the master node sends first information to the first secondary node, where the first information is used by the first secondary node to select a first frequency band, and the first information includes a first index; and the master node sends second information to the second secondary node, where the second information is used by the second secondary node to select a second frequency band, and the second information includes the first index. The first index indicates a first frequency band combination supported by a terminal device, and the first frequency band and the second frequency band are in the first frequency band combination. According to the method the terminal device can correctly execute configuration information generated by the plurality of secondary nodes for the terminal device.

20 Claims, 10 Drawing Sheets

MULTI-CONNECTIVITY COMMUNICATION METHOD AND APPARATUS

CROSS-REFERENCE TO RELATED APPLICATIONS

This application is a continuation of International Application No. PCT/CN2022/118763, filed on Sep. 14, 2022, which claims priority to Chinese Patent Application No. 202111086156.2, filed on Sep. 16, 2021. The disclosures of the aforementioned applications are hereby incorporated by reference in their entireties.

TECHNICAL FIELD

Embodiments relate to the wireless communication field, and a communication method and an apparatus.

BACKGROUND

In a wireless network, one terminal device may simultaneously maintain a communication connection to two or more access network devices, to increase a transmission rate. When the terminal device communicates with two access network devices, the connectivity may be referred to as dual connectivity (DC), or referred to as multi-radio dual connectivity (MR-DC). When the terminal device communicates with more than two access network devices, the connectivity may be referred to as multi-connectivity (MC), or may be referred to as multi-radio multi-connectivity (MR-MC). In the foregoing access network devices, an access network device that has control plane signaling interaction with a core network is referred to as a master node (MN), and another access device is referred to as a secondary node (SN).

In the MR-MC, a conflict may occur between frequency bands selected by a plurality of SNs. When the conflict occurs, the terminal device cannot establish connections to the plurality of SNs. Therefore, the terminal device may initiate a radio resource control (RRC) re-establishment procedure, causing communication of the terminal device to be interrupted.

SUMMARY

Embodiments provide a communication method and an apparatus, to resolve a problem that a conflict occurs between frequency bands selected by a plurality of SNs in MR-MC.

According to a first aspect, the embodiments provide a multi-connectivity communication method. The method includes:

A master node determines a first secondary node and a second secondary node; the master node sends first information to the first secondary node, and sends second information to the second secondary node, where the first information is used by the first secondary node to select a first frequency band, the first information includes a first index, the second information is used by the second secondary node to select a second frequency band, the second information includes the first index, the first index indicates a first frequency band combination supported by a terminal device, and the first frequency band and the second frequency band are in a first frequency band combination.

According to the method, frequency bands used by a plurality of secondary nodes are different and are in a same frequency band combination, to improve capability configuration efficiency of the terminal device, so that the terminal device can correctly execute configuration information generated by the plurality of secondary nodes for the terminal device, and a procedure of adding a secondary node is successfully completed. In this way, the terminal device can normally communicate with the plurality of secondary nodes, and communication quality of the terminal device in a multi-connectivity communication process is improved.

In a possible implementation, the master node receives a secondary node addition request from the first secondary node, where the secondary node addition request includes an identifier of the second secondary node; and the master node determines the second secondary node based on the identifier of the second secondary node.

According to the implementation, the first secondary node can actively trigger adding of the secondary node.

In a possible implementation, the first information further includes an identifier of a frequency band available to the first secondary node in the first frequency band combination; the second information further includes an identifier of a frequency band available to the second secondary node in the first frequency band combination; and the frequency band available to the first secondary node in the first frequency band combination does not overlap the frequency band available to the second secondary node in the first frequency band combination.

According to the implementation, the frequency band combination selected by the first secondary node and the frequency band combination selected by the second secondary node can be the same, and the first frequency band is different from the second frequency band, to improve capability configuration efficiency of the terminal device, and ensure normal communication between the terminal device and each secondary node.

In a possible implementation, the first information further indicates a first set, where the first set includes a frequency band that is in the first frequency band combination and that has been allocated or pre-allocated to the master node, and a frequency band that is in the first frequency band combination and that has been allocated or pre-allocated to a secondary node other than the first secondary node; the second information further indicates a second set, where the second set includes a frequency band that is in the first frequency band combination and that has been allocated or pre-allocated to the master node, and a frequency band that is in the first frequency band combination and that has been allocated or pre-allocated to a secondary node other than the second secondary node; and the first set does not overlap the second set.

Alternatively, the first information further indicates a first set, where the first set includes a frequency band that is in the first frequency band combination and that has been allocated or pre-allocated to a secondary node other than the first secondary node; and the second information further indicates a second set, where the second set includes a frequency band that is in the first frequency band combination and that has been allocated or pre-allocated to a secondary node other than the second secondary node.

According to the implementation, the frequency band combination selected by the first secondary node and the frequency band combination selected by the second secondary node can be the same, and the first frequency band is different from the second frequency band, to improve capability configuration efficiency of the terminal device, and ensure normal communication between the terminal device and each secondary node.

In a possible implementation, the first information includes indexes respectively corresponding to at least one frequency band combination supported by the terminal device, and the indexes respectively corresponding to the at least one frequency band combination include the first index; the master node receives the first index from the first secondary node; and the master node sends the second information to the second secondary node, where the second information includes the first index and an identifier of a frequency band available to the second secondary node in the first frequency band combination.

According to the implementation, the frequency band combination selected by the first secondary node and the frequency band combination selected by the second secondary node can be the same, and the first frequency band is different from the second frequency band, to improve capability configuration efficiency of the terminal device, and ensure normal communication between the terminal device and each secondary node.

In a possible implementation, the first information includes indexes respectively corresponding to at least one frequency band combination supported by the terminal device, and the indexes respectively corresponding to the at least one frequency band combination include the first index; the master node receives, from the first secondary node, the first index and an identifier of the first frequency band; and the master node sends the second information to the second secondary node, where the second information includes the first index, an identifier of a frequency band selected by the master node from the first frequency band combination, and the identifier of the first frequency band.

According to the implementation, the frequency band combination selected by the first secondary node and the frequency band combination selected by the second secondary node can be the same, and the first frequency band is different from the second frequency band, to improve capability configuration efficiency of the terminal device, and ensure normal communication between the terminal device and each secondary node.

In a possible implementation, the method further includes: the master node receives a response to the first information from the first secondary node, where the response to the first information includes first configuration information, and the first configuration information is used by the first secondary node to establish a connection to the terminal device; the master node receives a response to the second information from the second secondary node, where the response to the second information includes second configuration information, and the second configuration information is used by the second secondary node to establish a connection to the terminal device; the master node sends the first configuration information and the second configuration information to the terminal device; the master node receives, from the terminal device, a response to the first configuration information and a response to the second configuration information; and the master node sends the response to the first configuration information to the first secondary node, and the master node sends the response to the second configuration information to the second secondary node.

In a possible implementation, the master node sends a first radio resource control (RRC) message to the terminal device, where the first RRC message includes the first configuration information and the second configuration information; and the master node receives a second RRC message from the terminal device, where the second RRC message includes the response to the first configuration information and the response to the second configuration information.

In a possible implementation, the first RRC message further includes first indication information and second indication information, the first indication information indicates that the first configuration information is configured by the first secondary node for the terminal device, and the second indication information indicates that the second configuration information is configured by the second secondary node for the terminal device; and the second RRC message further includes third indication information and fourth indication information, the third indication information indicates that the response to the first configuration information corresponds to the first secondary node, and the fourth indication information indicates that the response to the second configuration information corresponds to the second secondary node.

According to the implementation, the terminal device can distinguish between the first configuration information and the second configuration information based on the first RRC message, and the master node determines, based on the second RRC message, a correspondence between the response to the first configuration information and the response to the second configuration information and the first secondary node and the second secondary node.

In a possible implementation, a location of the first configuration information in the first RRC message is in one-to-one correspondence with a location of the response to the first configuration information in the second RRC message, and a location of the second configuration information in the first RRC message is in one-to-one correspondence with a location of the response to the second configuration information in the second RRC message.

According to the implementation, the terminal device can distinguish between the first configuration information and the second configuration information based on the first RRC message, and the master node determines, based on the second RRC message, a correspondence between the response to the first configuration information and the response to the second configuration information and the first secondary node and the second secondary node.

In a possible implementation, the master node sends fifth indication information to the first secondary node, where the fifth indication information indicates an identifier of a secondary node other than the first secondary node that is configured by the master node for the terminal device, and the fifth indication information includes the identifier of the second secondary node; and/or the master node sends sixth indication information to the second secondary node, where the sixth indication information indicates an identifier of a secondary node other than the second secondary node that is configured by the master node for the terminal device, and the sixth indication information includes the identifier of the first secondary node.

According to the implementation, the first secondary node may determine, based on the identifier of the secondary node other than the first secondary node that is configured by the master node for the terminal device, whether to trigger a procedure of releasing the secondary node or a procedure of changing the secondary node. In addition, the second secondary node may determine, based on the identifier of the secondary node other than the second secondary node that is configured by the master node for the terminal device, whether to trigger a procedure of releasing the secondary node or a procedure of changing the secondary node.

In a possible implementation, the first information further includes at least one of the following: information about at least one feature set combination associated with the first frequency band combination, a maximum transmit power of the terminal device on the first secondary node side, an identifier of a serving cell available to the first secondary node, and a PDCCH blind detection capability that is allowed to be configured by the first secondary node for the terminal device; and the second information further includes at least one of the following: the information about at least one feature set combination associated with the first frequency band combination, a maximum transmit power of the terminal device on the second secondary node side, an identifier of a serving cell available to the second secondary node, and a PDCCH blind detection capability that is allowed to be configured by the second secondary node for the terminal device.

In a possible implementation, the master node receives a first modification request from the first secondary node, where the first modification request is used to request to modify a first option; and the first option is one or more of options that correspond to the first secondary node and that are related to a capability of the terminal device, where the options that correspond to the first secondary node and that are related to a capability of the terminal device include at least one of the following: the frequency band combination used by the first secondary node, the frequency band used by the first secondary node in the first frequency band combination, the feature set combination that is used by the first secondary node and that is associated with the first frequency band combination, the maximum transmit power of the terminal device on the first secondary node side, the identifier of the serving cell available to the first secondary node, and the PDCCH blind detection capability that is allowed to be configured by the first secondary node for the terminal device. The master node sends, based on the first modification request, a second modification request to the second secondary node, where the second modification request is used to modify a second option, and the first option is associated with the second option; and the second option is one or more of options that correspond to the second secondary node and that are related to a capability of the terminal device, where the options that correspond to the second secondary node and that are related to a capability of the terminal device include at least one of the following: the frequency band combination used by the second secondary node, the frequency band used by the second secondary node in the first frequency band combination, the feature set combination that is used by the second secondary node and that is associated with the first frequency band combination, the maximum transmit power of the terminal device on the second secondary node side, the identifier of the serving cell available to the second secondary node, and the PDCCH blind detection capability that is allowed to be configured by the second secondary node for the terminal device.

According to the implementation, when the first secondary node requests to modify some configuration information that is currently used and that is related to the capability of the terminal device, the second secondary node may need to modify some configuration information that is currently used by the second secondary node and that is related to the capability of the terminal device.

In a possible implementation, the master node receives a third modification request from the first secondary node, where the third modification request is used to request to modify the first configuration information; and the master node sends, based on the third modification request, a fourth modification request to the second secondary node, where the fourth modification request indicates the second secondary node to modify the second configuration information.

According to the implementation, when the first secondary node requests to modify the first configuration information, the second secondary node may need to modify the second configuration information.

In a possible implementation, the method further includes: the master node determines a third secondary node; the master node sends third information to the third secondary node, where the third information is used by the third secondary node to select a frequency band, and the third information includes the first index; the master node receives a response to the third information from the third secondary node, where the response to the third information includes third configuration information, and the third configuration information is used by the third secondary node to establish a connection to the terminal device; and the master node sends, based on the third configuration information, a fifth modification request to the first secondary node, where the fifth modification request indicates the first secondary node to modify the first configuration information.

According to the implementation, because the third secondary node is added, the first secondary node (and/or the second secondary node) may need to modify some configuration information or the first configuration information (and/or the second configuration information) that is currently used and that is related to the capability of the terminal device. Therefore, the master node needs to indicate the first secondary node (and/or the second secondary node) to modify some configuration information and/or the first configuration information (and/or the second configuration information) that is currently used and that is related to the capability of the terminal device.

According to a second aspect, the embodiments provide a multi-connectivity establishment method. The method includes: a fourth secondary node receives fourth information from a master node, where the fourth information is used by the fourth secondary node to select a frequency band, the fourth information includes a first index, and the first index indicates a first frequency band combination supported by a terminal device. The fourth secondary node determines a fifth secondary node, and the fourth secondary node generates fifth information based on the fourth information and sends the fifth information to the fifth secondary node, where the fifth information is used by the fifth secondary node to select a frequency band, and the fifth information includes the first index. The frequency band selected by the fourth secondary node and the frequency band selected by the fifth secondary node are in the first frequency band combination.

According to the method, after the master node adds the fourth secondary node, the fourth secondary node may send a secondary node addition request to another secondary node, and the fourth secondary node further notifies, based on a limitation on a capability of the terminal device configured by the master node for the fourth secondary node, the another secondary node of the capability of the terminal device that is allowed to be used. This ensures that frequency bands used by a plurality of secondary nodes are different and are in a same frequency band combination, to improve capability configuration efficiency of the terminal device, so that the terminal device can correctly execute configuration information generated by the plurality of the secondary nodes for the terminal device. In this way, the terminal device can normally communicate with the plurality of secondary nodes, and communication quality of the terminal device in a multi-connectivity communication process is improved.

In a possible implementation, the fourth secondary node receives a secondary node addition request from the master node, where the secondary node addition request includes an identifier of the fifth secondary node, and the fourth secondary node determines the fifth secondary node based on the secondary node addition request.

According to the implementation, the fourth secondary node may receive the secondary node addition request from the master node, and then determine the fifth secondary node based on the secondary node addition request.

In a possible implementation, the fourth secondary node receives, from the master node, an identifier of a configured secondary node other than the fourth secondary node.

According to the implementation, the fourth secondary node can be prevented from repeatedly sending the secondary node addition request to a same secondary node.

In a possible implementation, the fourth information includes indexes respectively corresponding to N frequency band combinations supported by the terminal device, the indexes respectively corresponding to the N frequency band combinations include the first index, the fifth information includes indexes respectively corresponding to M frequency band combinations in the N frequency band combinations, and the indexes respectively corresponding to the M frequency band combinations include the first index, where $N \geq M \geq 1$; and the fourth secondary node receives the first index from the fifth secondary node.

According to the implementation, the fourth secondary node sends, to the fifth secondary node, indexes respectively corresponding to some frequency band combinations in the at least one frequency band combination indicated by the fourth information, and the fifth secondary node selects a frequency band combination. In this way, the fourth secondary node selects, based on the frequency band combination selected by the fifth secondary node, a frequency band combination the same as the frequency band combination selected by the fifth secondary node, so that the fifth secondary node and the fourth secondary node select a same frequency band combination.

In a possible implementation, the fourth secondary node receives, from the fifth secondary node, an identifier of a frequency band selected by the fifth secondary node from the first frequency band combination; and the fourth secondary node determines, based on the identifier of the frequency band selected by the fifth secondary node from the first frequency band combination, the frequency band selected by the fourth secondary node from the first frequency band combination, where the frequency band selected by the fifth secondary node from the first frequency band combination does not overlap the frequency band selected by the fourth secondary node from the first frequency band combination.

In a possible implementation, the fourth information includes indexes respectively corresponding to N frequency band combinations supported by the terminal device, the indexes respectively corresponding to the N frequency band combinations include the first index, and the fifth information includes the first index.

According to the implementation, the fourth secondary node first selects one frequency band combination from the at least one frequency band combination indicated by the fourth information, and sends a frequency band combination index to the fifth secondary node, so that the fifth secondary node and the fourth secondary node select a same frequency band combination.

In a possible implementation, the fifth information further includes an identifier of a frequency band available to the fifth secondary node in the first frequency band combination, or an identifier of the frequency band selected by the fourth secondary node from the first frequency band combination.

In a possible implementation, the fourth secondary node receives, from the master node, a key of the fifth secondary node, or the fourth secondary node derives a key of the fifth secondary node based on a key of the fourth secondary node.

In a possible implementation, the fourth information further includes at least one of the following: information about at least one feature set combination associated with the first frequency band combination, a maximum transmit power of the terminal device on the fourth secondary node side, an identifier of a serving cell available to the fourth secondary node, and a PDCCH blind detection capability that is allowed to be configured by the fourth secondary node for the terminal device; and the fifth information further includes at least one of the following: information about at least one feature set combination associated with the first frequency band combination, a maximum transmit power of the terminal device on the fifth secondary node side, an identifier of a serving cell available to the fifth secondary node, and a PDCCH blind detection capability that is allowed to be configured by the fifth secondary node for the terminal device.

According to a third aspect, the embodiments provide a multi-connectivity establishment method. The method includes: a terminal device receives first configuration information and second configuration information from a master node, where the first configuration information is used by a first secondary node to establish a connection to the terminal device, the second configuration information is used by a second secondary node to establish a connection to the terminal device, the first configuration information and the second configuration information is carried in a first RRC message, and a response to the first configuration information and a response to the second configuration information is carried in a second RRC message. The terminal device sends the response to the first configuration information and the response to the second configuration information to the master node, where the first RRC message further includes first indication information and second indication information, the first indication information indicates that the first configuration information is configured by the first secondary node for the terminal device, and the second indication information indicates that the second configuration information is configured by the second secondary node for the terminal device. The second RRC message further includes third indication information and fourth indication information, the third indication information indicates that the response to the first configuration information corresponds to the first secondary node, and the fourth indication information indicates that the response to the second configuration information corresponds to the second secondary node.

According to the method, the terminal device can distinguish between the first configuration information and the second configuration information based on the first RRC message, and the master node determines, based on the second RRC message, a correspondence between the response to the first configuration information and the response to the second configuration information and the first secondary node and the second secondary node.

According to a fourth aspect, the embodiments provide a multi-connectivity establishment method. The method includes:

A terminal device receives first configuration information and second configuration information from a master node, where the first configuration information is used by a first secondary node to establish a connection to the terminal device, the second configuration information is used by a second secondary node to establish a connection to the terminal device, the first configuration information and the second configuration information is carried in a first RRC message, and a response to the first configuration information and a response to the second configuration information is carried in a second RRC message. The terminal device sends the response to the first configuration information and the response to the second configuration information to the master node, where a location of the first configuration information in the first RRC message is in one-to-one correspondence with a location of the response to the first configuration information in the second RRC message, and a location of the second configuration information in the first RRC message is in one-to-one correspondence with a location of the response to the second configuration information in the second RRC message.

According to the method, the terminal device can distinguish between the first configuration information and the second configuration information based on the first RRC message, and the master node determines, based on the second RRC message, a correspondence between the response to the first configuration information and the response to the second configuration information and the first secondary node and the second secondary node.

According to a fifth aspect, the embodiments further provide an apparatus. The apparatus may perform the foregoing method implementation. The apparatus may be a chip or a circuit that can perform the functions corresponding to the foregoing method, or a device including the chip or the circuit.

In a possible implementation, the apparatus includes: a memory, configured to store computer-executable program code; and a processor, where the processor is coupled to the memory. The program code stored in the memory includes instructions. When the processor executes the instructions, the apparatus or a device on which the apparatus is installed is enabled to perform the method according to any one of the foregoing possible implementations.

The apparatus may further include a communication interface. The communication interface may be a transceiver. Alternatively, if the apparatus is a chip or a circuit, the communication interface may be an input/output interface of the chip, for example, an input/output pin.

In a possible implementation, the apparatus includes corresponding functional units, separately configured to implement the steps in the foregoing method. The function may be implemented by hardware, or may be implemented by hardware executing corresponding software. The hardware or the software includes one or more units corresponding to the foregoing functions.

According to a sixth aspect, the embodiments provide a non-transitory computer-readable storage medium. The non-transitory computer-readable storage medium stores a computer program, and when the computer program is run on an apparatus, the method according to any one of the possible implementations is performed.

According to a seventh aspect, the embodiments provide a computer program product. The computer program product includes a computer program, and when the computer program is run on an apparatus, the method according to any one of the possible implementations is performed.

According to an eighth aspect, the embodiments provide a communication system. The system includes a master node and at least two secondary nodes, and the master node is configured to implement any one of the possible implementations of the first aspect.

According to a ninth aspect, the embodiments provide a communication system. The system includes a master node and at least two secondary nodes, and one of the at least two secondary nodes is configured to implement any one of the possible implementations of the second aspect.

DETAILED DESCRIPTION OF EMBODIMENTS

The following clearly describes the solutions in embodiments with reference to the accompanying drawings. It is clear that the described embodiments are merely some, but not all, embodiments on. In the embodiments and accompanying drawings, the terms “first”, “second”, corresponding term numbers, and the like are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments. In addition, the terms “include”, “contain” and any other variants mean to cover the non-exclusive inclusion, so that a process, method, system, product, or device that includes a series of units is not necessarily limited to those units, but may include other units not expressly listed or inherent to such a process, method, product, or device.

In descriptions of embodiments, "/" means "or" unless otherwise specified. For example, A/B may indicate A or B. In the embodiments, "and/or" describes only an association relationship for describing associated objects and indicates that three relationships may exist. For example, A and/or B may indicate the following three cases: only A exists, both A and B exist, and only B exists. In addition, in the descriptions of the embodiments, "at least one item" means one or more items, and "a plurality of items" means two or more items. "At least one item (piece) of the following" or a similar expression thereof means any combination of these items, including a singular item (piece) or any combination of plural items (pieces). For example, at least one item (piece) of a, b, or c may indicate a, b, c, a and b, a and c, b and c, or a, b, and c, where a, b, and c may be in a singular form or a plural form.

Figure 1:
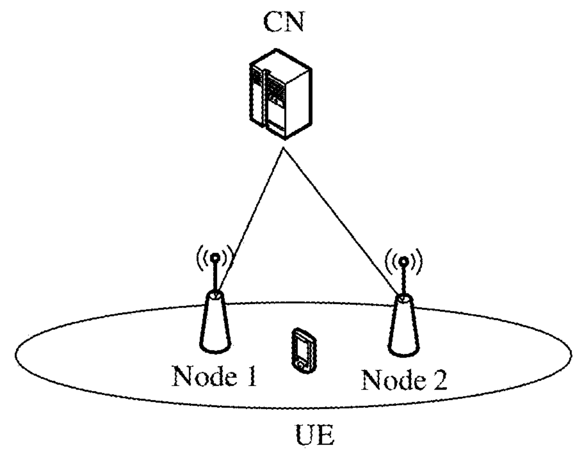
FIG. 1 is a schematic diagram of an architecture of a mobile communication system to which an embodiment is applied.

Embodiments relate to network elements including a terminal, a core network, and an access network device. FIG. 1 is a schematic diagram of an architecture of a mobile communication system to which an embodiment is applied. The mobile communication system includes UE 1, a node (node) 1, a node 2, and a core network (CN).

(1) A terminal device, also referred to as a terminal, user equipment (UE), a mobile station (MS), a mobile terminal (MT), or the like, is a device that provides voice and/or data connectivity for a user, for example, a hand-held device or an in-vehicle device with a wireless connection function. Currently, examples of some terminals are as follows: a mobile phone (mobile phone), a tablet computer, a notebook computer, a hand-held computer, a mobile internet device (MID), a wearable device, a virtual reality (VR) device, an augmented reality (AR) device, a wireless terminal in industrial control, a wireless terminal in self-driving, a wireless terminal in a remote medical surgery, a wireless terminal in a smart grid, a wireless terminal in transportation safety, a wireless terminal in a smart city, a wireless terminal in a smart home, and the like.

(2) An access network device is an access network (AN) node (or device) that connects a terminal to a network, for example, a base station. For example, the access network device herein may be a wired access network device or a radio access network device. Currently, some examples of radio access network (RAN) devices are: an evolved NodeB (gNB), a transmission and reception point (TRP), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), or a wireless fidelity (Wi-Fi) access point (AP).

Figure 2:
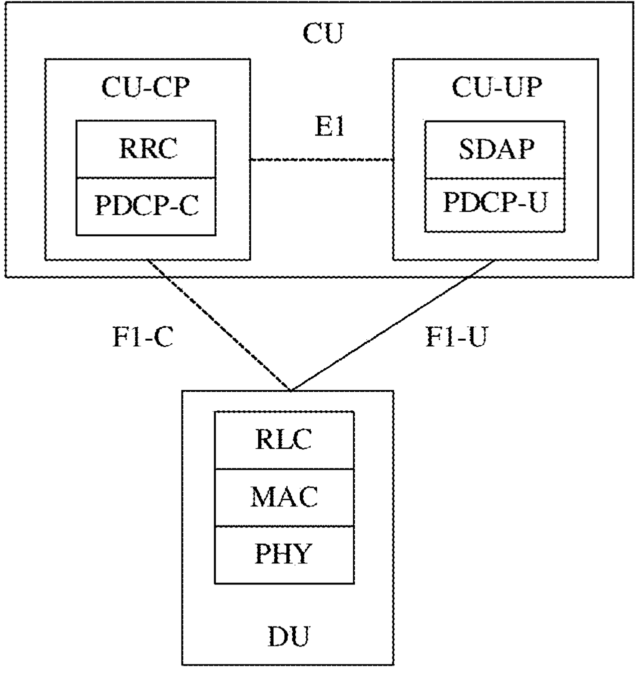
FIG. 2 is a schematic diagram of a structure of an access network device including a CU and a DU according to an embodiment.

In addition, in a network structure, an access network device may include a central unit (CU) node, a distributed unit (DU) node, or a RAN device including a CU node and a DU node. The RAN device including a CU node and a DU node separates protocol layers of a gNB in an NR system. Some functions of the protocol layers are controlled by the CU in a centralized manner, and some or all functions of the protocol layers are distributed in the DU, and the CU controls the DU in a centralized manner, as shown in FIG. 2. Further, the CU may be further divided into a control plane (CU-CP) and a user plane (CU-UP). The CU-CP can be responsible for a control plane function, and can include radio resource control (RRC) and a packet data convergence protocol (PDCP) (that is, PDCP-C) corresponding to the control plane. The PDCP-C can be responsible for data encryption and decryption, integrity protection, data transmission, and the like on the control plane. The CU-UP can be responsible for a user plane function, and can include a service data adaptation protocol (SDAP) and a PDCP (that is, PDCP-U) corresponding to the user plane. The SDAP layer can be responsible for processing data of a core network and mapping a flow (flow) to a bearer. The PDCP-U can be responsible for data encryption and decryption, integrity protection, header compression, sequence number maintenance, data transmission, and the like on the user plane. The CU-CP and the CU-UP are connected via an E1 interface. The CU-CP represents that the gNB is connected to the core network via an NG interface, and is connected to the DU via an F1 interface control plane (that is, F1-C). The CU-UP is connected to the DU via an F1 interface-user plane (that is, F1-U). Additionally, in another possible implementation, the PDCP-C is alternatively on the CU-UP.

In this embodiment, a base station is used as an access network device for description.

(3) A core network device refers to a device in a core network that provides service support for a terminal. Currently, examples of some core network devices are: an access and mobility management function (AMF) entity, a session management function (SMF) entity, a user plane function (UPF) entity, and the like, which are not listed one by one herein. The AMF entity may be responsible for access management and mobility management of a terminal. The SMF entity may be responsible for session management, for example, user session establishment. The UPF entity may be a functional entity on a user plane, and may be responsible for connecting to an external network. It should be noted that the entity in the embodiments may also be referred to as a network element or a functional entity. For example, the AMF entity may also be referred to as an AMF network element or an AMF functional entity. For another example, the SMF entity may also be referred to as an SMF network element, an SMF functional entity, or the like.

The solutions provided in embodiments can be used in various communication systems. For example, the method may be used in a long term evolution (LTE) system or a 5G system, or may be used in another future-oriented new system, for example, a programmable user plane system. This is not limited in embodiments. In addition, the term "system" and "network" may be substituted for each other.

The following briefly describes concepts in embodiments.

1. DC (or MR-DC), and MC (or MR-MC)

In the DC, a terminal device is separately connected to an MN and an SN. The MN has a control plane connection to a core network. A user plane of the SN may be connected to the core network connected to the MN (that is, the core network may directly send data to the terminal device via the SN). The MN may be a master access network device, for example, a master base station, and the SN may be a secondary access network device, for example, a secondary base station.

The MN and the SN have different radio link control (RLC) and media access control (MAC) entities. Data radio bearers (DRBs) are classified into a master cell group (MCG) bearer, a secondary cell group (SCG) bearer, and a split bearer (split bearer). The MCG bearer means that the RLC/MAC entity of the DRB is only on the MN, the SCG bearer means that the RLC/MAC entity of the DRB is only on the SN, and the split bearer means that the RLC/MAC entity of the DRB is on both the MN and the SN. A bearer whose PDCP is terminated on the MN may be referred to as an MN terminated bearer. For example, downlink (DL) data directly arrives at the MN from the core network, and is sent to the terminal device via the RLC/MAC after PDCP processing of the MN is performed (for example, SDAP processing may be performed first and then PDCP processing is performed); and uplink (UL) data is sent to the core network after PDCP processing of the MN is performed (for example, PDCP processing may be performed first and then SDAP processing is performed). Similarly, a bearer whose PDCP is terminated on the SN may be referred to as an SN terminated bearer. For example, DL data directly arrives at the SN from the core network, and is sent to the terminal device via the RLC/MAC after PDCP processing of the SN is performed (for example, SDAP processing may be performed first and then PDCP processing is performed); and UL data is sent to the core network after PDCP processing is performed (for example, PDCP processing may be performed first and then SDAP processing is performed).

Figure 3:
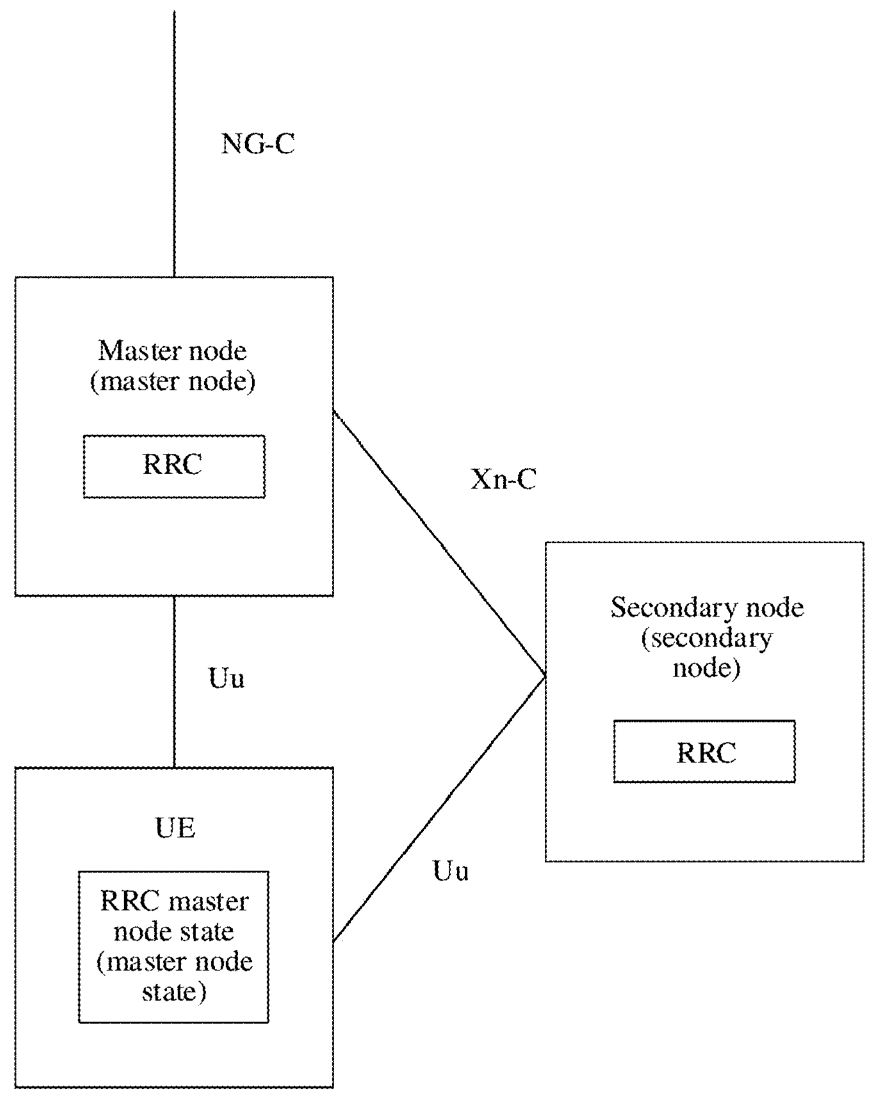
FIG. 3 is a diagram of a control plane architecture for MR-DC according to an embodiment.

In addition, both the MN and the SN have RRC entities, and each may generate an RRC message (that is, a control message, such as a measurement message), as shown in FIG. 3. The SN may directly send, to the terminal device, an RRC message generated by the SN. In this case, the terminal device also directly sends the RRC message to the SN. The RRC message directly exchanged between the SN and the terminal device is referred to as a signaling radio bearer (SRB) 3. In addition, the SN may also notify the MN of an RRC message generated by the SN, and then the MN sends the RRC message to the terminal device. In this case, the terminal device also forwards the RRC message to the SN via the MN. In other words, the terminal device sends the RRC message to the MN, and then the MN forwards the message to the SN.

The MN and the SN may be base stations that use a same radio access technology (RAT) (for example, both are 4G base stations or both are 5G base stations), or the MN and the SN may be base stations that use different RATs (for example, one is a 4G base station, and the other is a 5G base station). For example, the DC is in a plurality of types. For example, the DC in which an LTE base station is used as an MN, the MN has a control plane connection to a 4G core network, and an NR base station is used as an SN is EN-DC (E-UTRA NR-dual connectivity). The DC in which an LTE base station is used as an MN, the MN has a control plane connection to a 5G core network, and an NR base station is used as an SN is NG-RAN E-UTRA-NR Dual Connectivity (NGEN-DC). The DC in which an NR base station is used as an MN, the MN has a control plane connection to a 5G core network, and an LTE base station is used as an SN is NR EUTRA-dual connectivity (NE-DC). The DC in which an NR base station is used as an MN, the MN has a control plane connection to a 5G core network, and the NR base station is used as an SN is NR-DC (NR-NR Dual Connectivity).

Because the terminal device may simultaneously receive services of a plurality of cells under one base station, a serving cell group provided by the MN for the terminal device may also be referred to as an MCG, and a similar serving cell group provided by the SN for the terminal device is referred to as an SCG. The MCG and the SCG each include at least one cell. When the MCG has only one cell, the cell is a primary cell (PCell) of the terminal device. When the SCG has only one cell, the cell is a primary secondary cell (PSCell) of the terminal device. In an NR system, a PCell and a PSCell can be collectively referred to as a special cell (SpCell). When there are a plurality of cells in the MCG or SCG, a cell other than the SpCell is referred to as a secondary cell (SCell). In this case, carrier aggregation is performed on the SCell and the SpCell in each cell group (cell group), to jointly provide transmission resources for the terminal device.

For example, the PCell is a cell that works on a primary component carrier. A terminal device performs an initial connection establishment process or starts a connection re-establishment procedure in the cell. During handover process, the cell is indicated as a primary cell.

The PSCell is a cell in the SCG in which a terminal device is indicated to perform random access or initial physical uplink shared channel (PUSCH) transmission (for example, a random access process is omitted when an SCG change procedure is performed).

The SCell is a cell that works on a secondary component carrier. Once an RRC connection is established, the secondary cell may be configured to provide additional radio resources.

The serving cell is a cell served by a terminal device in an RRC_CONNECTED state. If carrier aggregation (CA) and/or DC are/is not configured, there is only one serving cell, that is, a PCell. If CA and/or DC are/is configured, a serving cell set includes a PCell and an SCell. The CA means that a plurality of component carriers (CCs) are configured for a single terminal device for data transmission. Each CC corresponds to an independent cell. For example, a terminal device configured with CA and/or DC is connected to one PCell and a maximum of 31 SCells. The PCell and all the SCells of the terminal device form a serving cell set of the terminal device. The serving cell may be a PCell or an SCell.

The foregoing concepts of some terms in the DC or MR-DC may be extended to an MC or MR-DC scenario.

In addition, it should be noted that, in the MC, the terminal device is separately connected to the MN and a plurality of SNs. The terminal device may establish communication connections to the MN and some of the plurality of SNs, and some SNs do not establish communication connections. Alternatively, the terminal device may establish communication connections to the MN and all of the plurality of SNs. For example, at a specific moment, the terminal device is in an active state only in X SNs, that is, only X SNs are activated, where X is an integer greater than or equal to 1, and the terminal device is in an inactive state in another SN. For another example, the MN pre-configures, for the terminal device, related configuration parameters corresponding to a plurality of SNs. The MN may indicate the terminal device to establish communication connections to X SNs, where X is an integer greater than or equal to 1, and the terminal device communicates with only the X SNs at a specific moment. For another example, the MN configures, for the terminal device, related configuration parameters corresponding to a plurality of SNs. The terminal device may simultaneously communicate with the plurality of SNs, and the terminal device may communicate with the plurality of SNs at a specific moment.

In addition, the MN may initiate adding of a new SN, or the SN may initiate adding of a new SN. Both the MN and the SN may trigger an SN change. In other words, an SN currently connected to the terminal device changes to another SN. Either the MN or the SN may trigger modification of the SN, that is, the SN does not change, but configuration information corresponding to the SN needs to be modified, or a capability of the terminal device currently used by the SN is modified.

2. Frequency Band Combination

One frequency band combination includes at least two frequency bands. The terminal device can support one or more frequency band combinations. For example, the frequency band combinations supported by the terminal device may be included in a frequency band combination list, and the frequency band combination list includes one or more frequency band combinations. Table 1 and Table 2 show two possible implementations of the frequency band combination list.

In Table 1A, the frequency band combination list includes four frequency band combinations, and indexes of the four frequency band combinations are sequentially 1, 2, 3, and 4. Each frequency band combination is divided into two parts, where a first part is a frequency band range available to the MN, and a second part is a frequency band range available to the SN. The terminal device uses different frequency bands to communicate with different SNs. Alternatively, in Table 1B, the frequency band combination list includes four frequency band combinations, and indexes of the four frequency band combinations are sequentially 1, 2, 3, and 4. Each frequency band combination is divided into two parts, where a first part is a frequency band range available to a first type of a RAT base station (for example, an NR base station), and a second part is a frequency band range available to a second type of a RAT base station (for example, an LTE base station). The MN and the SN select an available frequency band range corresponding to the RATs. For example, if the MN is an NR base station and the SN is an LTE base station, the MN selects a frequency band in an available frequency band range corresponding to NR, and the SN selects a frequency band in an available frequency band range corresponding to LTE.

For example, the terminal device may communicate with three base stations, where one base station is an MN, and the other two base stations are an SN 1 and an SN 2. A frequency band combination supported by the terminal device is shown in Table 1A, Table 1B, or Table 2. A frequency band combination corresponding to a frequency band combination index 1 is used as an example. The terminal device may communicate with the MN on a band 1, communicate with the SN 1 on a band 6, and communicate with the SN 2 on a band 9. It may be understood that only band 1, band 6, and band 9 are used as examples for description herein, and this is not limited. The frequency band used for communication between the terminal device and the MN, the frequency band used for communication between the terminal device and the SN 1, and the frequency band used for communication between the terminal device and the SN 2 are different from each other. The frequency band used for communication between the terminal device and the MN, the frequency band used for communication between the terminal device and the SN 1, and the frequency band used for communication between the terminal device and the SN 2 are in the frequency band combination corresponding to the frequency band combination index 1.

For example, Table 1A, Table 1B, or Table 2 may be directly stored in each node, and does not need to be notified via signaling. Alternatively, Table 1A, Table 1B, or Table 2 may be notified to the secondary node via signaling sent by the master node. This is not limited.

TABLE 1A

| Frequency band combination index | Frequency band (Band) range available to an MN | Frequency band (Band) range available to an SN |
|---|---|---|
| 1 | Band 1, Band 2, Band 5 | Band 6, Band 7, Band 9 |
| 2 | Band 2, Band 3, Band 6 | Band 1, Band 7, Band 9 |
| 3 | Band 2, Band 3 | Band 1, Band 6, Band 7, Band 11 |
| 4 | Band 1, Band 10 | Band 5, Band 11, Band 12 |

TABLE 1B

| Frequency band combination index | Frequency band range available to a first type of a RAT base station | Frequency band range available to a second type of a RAT base station |
|---|---|---|
| 1 | Band 1, Band 2, Band 5 | Band 6, Band 7, Band 9 |
| 2 | Band 2, Band 3, Band 6 | Band 1, Band 7, Band 9 |
| 3 | Band 2, Band 3 | Band 1, Band 6, Band 7, Band 11 |
| 4 | Band 1, Band 10 | Band 5, Band 11, Band 12 |

In Table 2, a difference from Table 1A and Table 1B lies in that frequency bands in each frequency band combination are not divided. For any frequency band combination, the terminal device may communicate with the MN on one frequency band in a frequency band range of the frequency band combination, and communicate with the SN on another frequency band in the frequency band range of the frequency band combination. A frequency band used by the terminal device to communicate with the MN is different from a frequency band used by the terminal device to communicate with the SN, and frequency bands used by the terminal device to communicate with different SNs are different.

TABLE 2

| Frequency band combination index | Available frequency band (Band) range |
|---|---|
| 1 | Band 1, Band 2, Band 5, Band 6, Band 7, Band 9 |
| 2 | Band 2, Band 3, Band 6, Band 1, Band 7, Band 9 |
| 3 | Band 2, Band 3, Band 1, Band 6, Band 7, Band 11 |
| 4 | Band 1, Band 5, Band 10, Band 11, Band 12 |

It should be noted that an identifier of each frequency band may be a location of the frequency band in the frequency band combination. For example, as shown in Table 2, in the frequency band combination corresponding to the frequency band combination index 1, a frequency band with an identifier of 0 is a band 1, a frequency band with an identifier of 1 is a band 2, a frequency band with an identifier of 2 is a band 5, a frequency band with an identifier of 3 is a band 6, a frequency band with an identifier of 4 is a band 7, and a frequency band with an identifier of 5 is a band 9. Alternatively, the identifier of each frequency band may refer to a frequency band number. For example, a corresponding frequency band number is specified for each frequency band in a protocol.

3. Feature Set

The feature set may include, but is not limited to, the following content: whether a terminal device supports configuration of an SCell without a synchronization signal and physical broadcast channel (PBCH) block (SSB), a subcarrier spacing supported by the terminal device, a bandwidth supported by the terminal device, a modulation scheme supported by the terminal device, and a quantity of multiple-input multiple-output (MIMO) layers supported by the terminal device.

Each frequency band may correspond to a plurality of feature sets. When the SN or the MN communicates with the terminal device over the frequency band, the SN or the MN generates configuration information for the terminal device based on one of the plurality of feature sets corresponding to the frequency band. For example, a feature set corresponding to the band 1 may include a feature set 1 to a feature set 6. When the SN or the MN communicates with the terminal device over the band 1, the SN or the MN generates configuration information for the terminal device based on one feature set in the feature set corresponding to the band 1. A feature set corresponding to the band 2 may include a feature set 1 to a feature set 6. When the SN or the MN communicates with the terminal device over the band 2, the SN or the MN generates configuration information for the terminal device based on one feature set in the feature set corresponding to the band 2. In addition, for different frequency bands, a same identifier may be used to represent different feature sets. For example, a feature set 1 in the feature set corresponding to the band 1 and a feature set 1 in the feature set corresponding to the band 2 are two different feature sets, but values of some parameters in the two feature sets 1 may be the same.

Each frequency band combination corresponds to at least one feature set combination. For example, a feature set of each frequency band in a frequency band combination forms a feature set combination, where the feature set of each frequency band refers to one of a plurality of feature sets corresponding to the frequency band. Because each frequency band corresponds to a plurality of feature sets, each frequency band combination may also correspond to a plurality of feature set combinations.

For example, for a frequency band combination, the frequency band combination includes a first frequency band and a second frequency band, and the frequency band combination may correspond to a first feature set combination and a second feature set combination, where the first feature set combination includes one feature set (denoted as a feature set A) in a plurality of feature sets corresponding to the first frequency band and one feature set (denoted as a feature set B) in a plurality of feature sets corresponding to the second frequency band, the second feature set combination includes one feature set (denoted as a feature set C) in the plurality of feature sets corresponding to the first frequency band and one feature set (denoted as a feature set D) in the plurality of feature sets corresponding to the second frequency band, and the feature set A is different from the feature set C, and/or the feature set B is different from the feature set D.

TABLE 3

| Feature set combination index | Feature set of band 1 | Feature set of band 2 | Feature set of band 5 | Feature set of band 6 | Feature set of band 7 | Feature set of band 9 |
|---|---|---|---|---|---|---|
| 1 | Feature set 1 | Feature set 1 | Feature set 6 | Feature set 1 | Feature set 1 | Feature set 6 |
| 2 | Feature set 3 | Feature set 2 | Feature set 5 | Feature set 2 | Feature set 2 | Feature set 5 |
| 3 | Feature set 5 | Feature set 3 | Feature set 4 | Feature set 3 | Feature set 3 | Feature set 4 |
| 4 | Feature set 2 | Feature set 4 | Feature set 3 | Feature set 4 | Feature set 4 | Feature set 3 |
| 5 | Feature set 4 | Feature set 5 | Feature set 2 | Feature set 5 | Feature set 5 | Feature set 2 |
| 6 | Feature set 6 | Feature set 6 | Feature set 1 | Feature set 6 | Feature set 6 | Feature set 1 |

TABLE 4

| Feature set combination index | Feature set of band 2 | Feature set of band 3 | Feature set of band 6 | Feature set of band 1 | Feature set of band 7 | Feature set of band 9 |
|---|---|---|---|---|---|---|
| 1 | Feature set 3 | Feature set 1 | Feature set 6 | Feature set 6 | Feature set 1 | Feature set 6 |
| 2 | Feature set 1 | Feature set 5 | Feature set 5 | Feature set 2 | Feature set 2 | Feature set 4 |
| 3 | Feature set 5 | Feature set 3 | Feature set 4 | Feature set 3 | Feature set 6 | Feature set 5 |
| 4 | Feature set 2 | Feature set 4 | Feature set 4 | Feature set 4 | Feature set 4 | Feature set 3 |
| 5 | Feature set 4 | Feature set 3 | Feature set 2 | Feature set 5 | Feature set 5 | Feature set 2 |
| 6 | Feature set 6 | Feature set 6 | Feature set 1 | Feature set 1 | Feature set 3 | Feature set 1 |

For example, a frequency band combination supported by the terminal device is shown in Table 1A, Table 1B, or Table 2. A frequency band combination corresponding to a frequency band combination index 1 includes a band 1, a band 2, a band 5, a band 6, a band 7 and a band 9, and the frequency band combination corresponds to six feature set combinations, that is, feature set combinations respectively corresponding to a feature set combination index 1 to a feature set combination index 6, as shown in Table 3. A frequency band combination corresponding to a frequency band combination index 2 includes a band 2, a band 3, a band 6, a band 1, a band 7 and a band 9, and the frequency band combination corresponds to six feature set combinations, that is, feature set combinations corresponding to a feature set combination index 1 to a feature set combination index 6, as shown in Table 4.

The first row in Table 3 is used as an example. In a feature set combination corresponding to the feature set combination index 1, a feature set of the band 1 is a feature set 1, a feature set of the band 2 is a feature set 1, a feature set of the band 3 is a feature set 6, a feature set of the band 6 is a feature set 1, a feature set of the band 7 is a feature set 1, and a feature set of the band 9 is a feature set 6. The foregoing four feature sets 1 are different. For example, it is assumed that feature sets corresponding to the band 1 include a feature set 1 to a feature set 6 and feature sets corresponding to the band 2 include a feature set 1 to a feature set 6, and the feature set of the band 1 is a feature set 1, that is, the feature set 1 in six feature sets corresponding to the band 1. The feature set of the band 2 is a feature set 1, that is, the feature set 1 in six feature sets corresponding to the band 2. The feature set 1 in the six feature sets corresponding to the band 2 is different from the feature set 1 in the six feature sets corresponding to the band 1. Similarly, the foregoing two feature sets 6 are also different.

For example, a frequency band combination supported by the terminal device is shown in Table 1A, Table 1B, or Table 2. The MN communicates with the terminal device over the band 1 in a frequency band combination corresponding to a frequency band combination index 1, the SN 1 communicates with the terminal device over the band 6 in the frequency band combination corresponding to the frequency band combination index 1, and the SN 2 communicates with the terminal device over the band 9 in the frequency band combination corresponding to the frequency band combination index 1.

The first row in Table 3 is used as an example, that is, the feature set combination corresponding to the feature set combination index 1 is used as an example. The MN generates configuration information for the terminal device based on a feature set 1 in a feature set corresponding to the band 1. The SN 1 generates configuration information for the terminal device based on a feature set 1 in a feature set corresponding to the band 6. The SN 2 generates configuration information for the terminal device based on a feature set 6 in a feature set corresponding to the band 9.

The second row in Table 3 is used as an example, that is, the feature set combination corresponding to the feature set combination index 2 is used as an example. The MN generates configuration information for the terminal device based on a feature set 3 in a feature set corresponding to the band 1. The SN 1 generates configuration information for the terminal device based on a feature set 3 in a feature set corresponding to the band 6. The SN 2 generates configuration information for the terminal device based on a feature set 5 in a feature set corresponding to the band 9.

For example, Table 3 and Table 4 may be directly stored in each node, and do not need to be notified via signaling. Alternatively, Table 3 and Table 4 may be notified to the secondary node via signaling sent by the master node. This is not limited.

4. Capability of a Terminal Device

It should be noted that the capability of the terminal device includes, but is not limited to, the following content:

a frequency band combination supported by the terminal device (for details, refer to the foregoing related descriptions about the frequency band combination), a feature set combination associated with the frequency band combination supported by the terminal device (for details, refer to the foregoing related descriptions about the feature set), a maximum transmit power of the terminal device, a maximum quantity of serving cells supported by the terminal device, a total physical downlink control channel (PDCCH) blind detection capability supported by the terminal device, a PDCCH blind detection capability supported by the terminal device on an MCG side, a PDCCH blind detection capability supported by the terminal device on an SCG side, and the like.

The PDCCH blind detection capability is a maximum quantity of candidate PDCCHs monitored by the terminal device, and the maximum quantity is indicated in a unit of a cell quantity. For example, if the maximum quantity is A, it indicates a PDCCH blind detection capability corresponding to PDCCH monitoring of A cells.

In the MC, one terminal device may be connected to three or more base stations to obtain services. One base station is an MN, that is, a master node, and the other base station is an SN, that is, a secondary node. The following uses an example in which the terminal device is connected to three base stations to describe two possible scenarios in which multi-connectivity is established.

Scenario 1: One of the three base stations is an MN, and the other two base stations are SNs. The two SNs are an SN 1 and an SN 2, and the status between the two SNs is the same.

Scenario 1 may further include two cases.

Case 1: The MN simultaneously initiates adding of the SN 1 and the SN 2. Alternatively, the MN first initiates adding of the SN 1, and then initiates adding of the SN 2, but the MN does not need to wait for a response for adding the SN 1 from the SN 1 before adding the SN 2, that is, the MN may add the SN 2 before receiving a response for adding the SN 1 from the SN 1.

Case 2: The MN first initiates adding of the SN 1, and adds the SN 2 only after receiving a response for adding the SN 1 from the SN 1. Alternatively, the MN first initiates adding of the SN 2, and adds the SN 1 only after receiving a response for adding the SN 2 from the SN 2.

Scenario 2: One of the three base stations is an MN, and the other two base stations are SNs. The two SNs are an SN 1 and an SN 2, but one SN may also be used as an MN of another SN. For example, the SN 1 may be used as an MN of the SN 2, or the SN 2 may be used as an MN of the SN 1.

When the SN 1 may be used as the MN of the SN 2, Scenario 2 may further include two cases.

Case 3: The MN initiates adding of the SN 1, the MN indicates the SN 1 to add the SN 2, and the SN 1 initiates adding of the SN 2.

Case 4: The MN initiates adding of the SN 1, and the SN 1 determines to initiate adding of the SN 2.

It may be understood that Scenario 1 and Scenario 2 may be further extended to a case in which the terminal device is connected to more than three base stations. Details are not described herein again.

Figure 4:
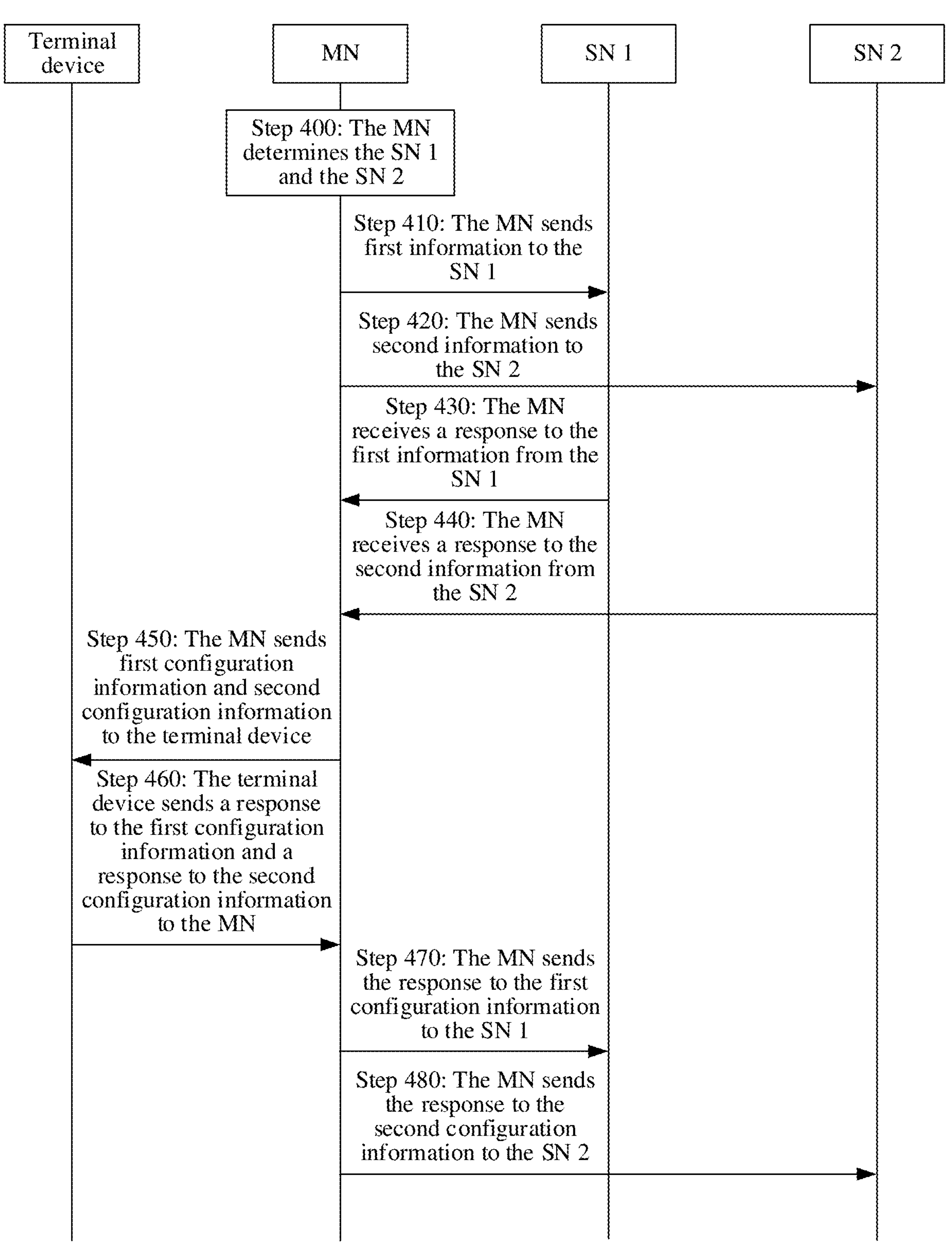
FIG. 4 is an overview flowchart 1 of a multi-connectivity communication method according to an embodiment.

The following describes a communication method provided in the embodiments with reference to the accompanying drawings. For brevity of description, a master node in the following described embodiments is referred to as an MN, and a secondary node is referred to as an SN. When there are two or more secondary nodes, the two or more secondary nodes are respectively referred to as a first secondary node or an SN 1, a second secondary node or an SN 2, a third secondary node or an SN 3, and the like. The following describes the communication method provided in this embodiment by using Case 1 as an example, to resolve a problem that a conflict occurs between frequency bands selected by a plurality of SNs in MR-MC, as shown in FIG. 4.

Step 400: An MN determines an SN 1 and an SN 2.

For example, the MN may simultaneously determine the SN 1 and the SN 2.

It may be understood that, the simultaneous herein is not absolutely simultaneous in time, but means that two or more SNs are determined in a same selection. For example, the MN first initiates adding of the SN 1, and then initiates adding of the SN 2, as described in Case 1. Details are not described again. For example, the MN may select, based on a measurement result reported by the terminal device, to configure a plurality of SNs for the terminal device. For example, the MN may select, based on a measurement result reported by the terminal device, base stations corresponding to a plurality of cells whose signal quality is better than a preset threshold as SNs; the MN may determine, based on load of each base station, a plurality of base stations whose load is lower than a preset threshold as SNs; or the MN may determine a plurality of SNs based on signal quality and load.

It should be noted that a specific manner of determining the SN by the MN is not limited.

Step 410: The MN sends first information to the SN 1, where the first information is used by the SN 1 to select a first frequency band, and the first information includes a first index. The first index indicates a first frequency band combination supported by the terminal device. For example, the first information may be included in an SN addition request message.

It may be understood that the terminal device may support one or more frequency band combinations, and the first frequency band combination is one of the one or more frequency band combinations supported by the terminal.

Step 420: The MN sends second information to the SN 2, where the second information is used by the SN 2 to select a second frequency band, the second information includes the first index, and the first frequency band and the second frequency band are in the first frequency band combination.

For a detailed description of the first frequency band combination, refer to the foregoing content related to the frequency band combination. Details are not described again.

It may be understood that the first frequency band is different from the second frequency band.

For example, the second information may be included in an SN addition request message.

It should be noted that a time sequence of step 410 and step 420 is not limited.

The following describes possible implementations of the first information and the second information.

Manner 1: The first information includes the first index and an identifier of a frequency band available to the SN 1 in the first frequency band combination. The second information includes the first index and an identifier of a frequency band available to the SN 2 in the first frequency band combination. The frequency band available to the SN 1 in the first frequency band combination does not overlap the frequency band available to the SN 2 in the first frequency band combination.

It should be noted that the identifier of the frequency band available to the SN 1 in the first frequency band combination may also be described as an identifier of a frequency band that is allowed to be selected (or is allowed to be used) by the SN 1 in the first frequency band combination. The identifier of the frequency band available to the SN 2 in the first frequency band combination may also be described as an identifier of a frequency band that is allowed to be selected (or is allowed to be used) by the SN 2 in the first frequency band combination. That the frequency band available to the SN 1 in the first frequency band combination does not overlap the frequency band available to the SN 2 in the first frequency band combination may be understood as that the frequency band available to the SN 1 in the first frequency band combination and the frequency band available to the SN 2 in the first frequency band combination do not have a same frequency band.

For example, a frequency band combination supported by the terminal device is shown in Table 1A, Table 1B, or Table 2. The first information may include an index 1, an identifier of the band 6, and an identifier of the band 7. The second information may include the index 1 and an identifier of the band 9. Correspondingly, the SN 1 may select one band from the band 6 and the band 7. The SN 2 may use the band 9 as a frequency band selected by the SN 2.

Manner 2: The first information includes a first index, the first information further indicates a first set, and the first set includes a frequency band that is in the first frequency band combination and that has been allocated or pre-allocated to another SN other than the SN 1, that is, a frequency band that is unavailable to the SN 1. Optionally, the first set further includes a frequency band that is in the first frequency band combination and that has been allocated or pre-allocated to the MN. The second information includes the first index, the second information further indicates a second set, and the second set includes a frequency band that is in the first frequency band combination and that has been allocated or pre-allocated to another SN other than the SN 2, that is, a frequency band that is unavailable to the SN 2. Optionally, the second set further includes a frequency band that is in the first frequency band combination and that has been allocated or pre-allocated to the MN.

When the first set does not include the frequency band that is in the first frequency band combination and that has been allocated or pre-allocated to the MN, and the second set does not include the frequency band that is in the first frequency band combination and that has been allocated or pre-allocated to the MN, a frequency band (that is, a frequency band available to the SN 1) in the first frequency band combination other than the first set and the frequency band that has been allocated or pre-allocated to the MN does not overlap with a frequency band (that is, a frequency band available to the SN 2) in the first frequency band combination other than the second set and the frequency band that has been allocated or pre-allocated to the MN. When the first set includes the frequency band that is in the first frequency band combination and that has been allocated or pre-allocated to the MN, and the second set includes the frequency band that is in the first frequency band combination and that has been allocated or pre-allocated to the MN, a frequency band (that is, a frequency band available to the SN 1) in the first frequency band combination other than the first set does not overlap a frequency band (that is, a frequency band available to the SN 2) in the first frequency band combination other than the second set.

For example, the frequency band combination supported by the terminal device is shown in Table 2. The first information may include an index 1, an identifier of the band 1, an identifier of the band 2, an identifier of the band 6, and an identifier of the band 7. For example, the band 1 and the band 2 are frequency bands that have been allocated or pre-allocated to the MN, and the band 6 and the band 7 are frequency bands that have been allocated or pre-allocated to the SN 2. In this case, the SN 1 does not need to know which frequency band in the foregoing frequency bands is the frequency band that has been allocated or pre-allocated to the MN, and which frequency band is the frequency band that has been allocated or pre-allocated to another SN. That is, the SN 1 only needs to know that the frequency bands are frequency bands unavailable to the SN 1, and does not need to know specific frequency band occupation statuses of the unavailable frequency bands. The SN 1 determines, based on the first information and Table 2, that the band 1, the band 2, the band 6, and the band 7 cannot be selected (or unavailable or not allowed to be used) in the frequency band combination corresponding to the frequency band combination index 1, and then determines that a frequency band selection range of the SN 1 is the band 5 and the band 9, and the SN 1 selects a frequency band from the band 5 and the band 9. Similarly, the second information may include the frequency band combination index 1, an identifier of the band 1, an identifier of the band 2, an identifier of the band 5, and an identifier of the band 9. The SN 2 may determine, based on Table 2 and the second information, that a frequency band selection range of the SN 2 is the band 6 and the band 7, and the SN 2 selects a frequency band from the band 6 and the band 7.

For example, the frequency band combination supported by the terminal device is shown in Table 1A. The first information may include an index 1, an identifier of the band 6, and an identifier of the band 7. In addition, the first information may not include a frequency band that has been allocated or pre-allocated to the MN. In this case, the SN 1 may not need to know which frequency band is the frequency band that has been allocated or pre-allocated to another SN, that is, the SN 1 only needs to know that the frequency band is the frequency band unavailable to the SN 1, and does not need to know a specific frequency band occupation status of the available frequency bands. The SN 1 determines, based on the first information and Table 1, that the band 6 and the band 7 cannot be selected from the frequency band combination corresponding to the index 1, and further determines that a frequency band available to the SN 1 is the band 9. Similarly, the second information may include the index 1 and an identifier of the band 9. The SN 2 may determine, based on Table 1A and the second information, that a frequency band selection range of the SN 2 is the band 6 and the band 7, and the SN 2 selects a frequency band from the band 6 and the band 7.

In Manner 1 and Manner 2, the frequency band combination selected by the SN 1 is the same as the frequency band combination selected by the SN 2, and the first frequency band is different from the second frequency band, to improve capability configuration efficiency of the terminal device, and ensure normal communication between the terminal device and each SN.

It should be noted that the following two points: First, with reference to Manner 1, a specific manner in which the MN determines the first frequency band combination, the frequency band available to the SN 1 in the first frequency band combination, and the frequency band available to the SN 2 in the first frequency band combination is not limited.

For example, different nodes support different frequency bands. The MN may determine the first frequency band combination based on a frequency band supported by the MN, a frequency band supported by the SN 1, and a frequency band supported by the SN 2. The first frequency band combination includes the frequency band supported by the MN, the frequency band supported by the SN 1, and the frequency band supported by the SN 2.

Further, the MN may determine, based on the frequency band supported by the MN, the frequency band available to the MN in the first frequency band combination; determine, based on the frequency band supported by the SN 1, the frequency band available to the SN 1 in the first frequency band combination; and determine, based on the frequency band supported by the SN 2, the frequency band available to the SN 2 in the first frequency band combination. Alternatively, after determining the first frequency band combination, the MN may determine, based on a measurement result reported by the terminal device, a frequency band available to the MN in the first frequency band combination, a frequency band available to the SN 1 in the first frequency band combination, and/or a frequency band available to the SN 2 in the first frequency band combination. For example, the MN may determine, based on the measurement result reported by the terminal device, a cell whose signal quality is better than a preset threshold. If a cell whose signal quality is better than the preset threshold includes a cell A, the cell A is a cell in the SN 1 (that is, a frequency band corresponding to a cell supported by the SN 1), and a frequency band corresponding to the cell A is a frequency band in the first frequency band combination, the MN determines that a frequency band available to the SN 1 in the first frequency band combination includes the frequency band corresponding to the cell A.

Similarly, with reference to Manner 2, a specific manner in which the MN determines the first frequency band combination, the first set, and the second set is not limited.

Second, a specific manner in which the SN 1 determines the first frequency band from the first frequency band combination is not limited. For example, when the frequency bands available to the SN 1 in the first frequency band combination include a plurality of frequency bands, the SN 1 may randomly select a frequency band as a frequency band used for communication with the terminal device, that is, the first frequency band. Alternatively, the MN may further send the measurement result of the terminal device to the SN 1, and the SN 1 may further determine the first frequency band based on the measurement result of the terminal device. For example, the SN 1 may determine, based on the measurement result reported by the terminal device, a cell whose signal quality is better than a preset threshold, where a cell A is a cell in the SN 1. When a frequency band corresponding to the cell A is a frequency band in the first frequency band combination, and the frequency band available to the SN 1 in the first frequency band combination includes the frequency band corresponding to the cell A, the SN 1 may select, from the frequency band available to the SN 1 in the first frequency band combination, the frequency band corresponding to the cell A as a frequency band used for communication with the terminal device, that is, the first frequency band.

Similarly, a specific manner of determining the second frequency band by the SN 2 is not limited.

It may be understood that the first information may indicate the capability of the terminal device available to the SN 1. Therefore, in addition to being used by the SN 1 to select the first frequency band, the first information may further indicate a capability of another terminal device available to the SN 1. In some implementations, the first information further includes at least one of the following: information about a feature set combination associated with the first frequency band combination, a maximum transmit power of the terminal device on the SN 1 side, an identifier of a serving cell available to the SN 1, and a PDCCH blind detection capability that is allowed to be configured by the SN 1 for the terminal device.

Similarly, the second information may indicate the capability of the terminal device available to the SN 2. Therefore, in addition to being used by the SN 2 to select the second frequency band, the second information may further indicate a capability of another terminal device available to the SN 2. The second information further includes at least one of the following: information about a feature set combination associated with the first frequency band combination, a maximum transmit power of the terminal device on the SN 2 side, an identifier of a serving cell available to the SN 2, and a PDCCH blind detection capability that is allowed to be configured by the SN 2 for the terminal device.

According to the method, the first information indicates the capability of the terminal device available to the SN 1 and the second information indicates the capability of the terminal device available to the SN 2, so that the capability of the terminal device selected by the SN 1 does not conflict with the capability of the terminal device selected by the SN 2, and therefore the terminal device can normally communicate with a plurality of SNs, and communication quality of the terminal device in a multi-connectivity communication process is improved.

With reference to the foregoing related descriptions about the capability of the terminal device, the following describes the capability of the another terminal device available to the SN 1 indicated by the first information and the capability of the another terminal device available to the SN 2 indicated by the second information in the following several points.

1. The SN 1 and the SN 2 determine, based on a same feature set combination, a feature set used by each of the SN 1 and the SN 2. Therefore, the information about the feature set combination associated with the first frequency band combination included in the first information is the same as the information about the feature set combination associated with the first frequency band combination included in the second information.

For example, the frequency band combination supported by the terminal device is shown in Table 1A. The first information may include a frequency band combination index 1, an identifier of the band 9, and a feature set combination index {2}. The second information may include the frequency band combination index 1, an identifier of the band 6, and the feature set combination index {2}.

For another example, when the first frequency band combination is a frequency band combination corresponding to the frequency band combination index 1 in Table 2, the information about the at least one feature set combination associated with the first frequency band combination may indicate a feature set combination index in Table 3. When the first frequency band combination is a frequency band combination corresponding to the frequency band combination index 2 in Table 2, the information about the at least one feature set combination associated with the first frequency band combination may indicate a feature set combination index in Table 4.

2. A sum of the maximum transmit power of the terminal device on the SN 1 side and the maximum transmit power of the terminal device on the SN 2 side is less than the maximum transmit power of the terminal device.

3. The identifier of the serving cell available to the SN 1 does not overlap the identifier of the serving cell available to the SN 2, and a sum of a serving cell quantity indicated by the identifier of the serving cell available to the SN 1 and a serving cell quantity indicated by the identifier of the serving cell available to the SN 2 is less than a maximum serving cell quantity supported by the terminal device.

4. A sum of a quantity of PDCCHs indicated by the PDCCH blind detection capability that is allowed to be configured by the SN 1 for the terminal device and a quantity of PDCCHs indicated by the PDCCH blind detection capability that is allowed to be configured by the SN 2 for the terminal device is less than a quantity of PDCCHs indicated by the PDCCH blind detection capability that is supported by the terminal device on the SCG side.

Further, optionally, after step 410 and step 420, the method may further include the following steps.

Step 430: The MN receives, from the SN 1, a response to the first information, where the response to the first information includes first configuration information, and the first configuration information is used by the SN 1 to establish a connection to the terminal device.

For example, the first configuration information includes SCG configuration information and radio bearer configuration information. The SCG configuration information may include cell group configuration information on the SN 1 side, for example, includes an identifier of a cell group, and RLC, MAC, and physical layer configuration information. The radio bearer configuration information includes PDCP layer configuration information corresponding to each radio bearer. The first configuration information may be included in an RRC reconfiguration message generated by the SN 1.

It should be noted that the SN 1 may generate the first configuration information based on the first information.

For example, when the first information includes the information about the feature set combination associated with the first frequency band combination, the SN 1 may determine, based on the frequency band selected by the SN 1 and the information about the feature set combination associated with the first frequency band combination, one feature set in the feature set corresponding to the first frequency band, and generate the first configuration information based on the determined feature set.

For example, the frequency band combination supported by the terminal device is shown in Table 1A. The first information may include an index 1, an identifier of the band 9, and a feature set combination index {2}. The SN 1 may determine, based on Table 3, a feature set 5 in the feature set corresponding to the band 9, and generate the first configuration information for the terminal device based on the feature set 5 in the feature set corresponding to the band 9. It is assumed that the feature set 5 in the feature set corresponding to the band 9 indicates that a quantity of MIMO layers supported by the band 9 is 8. In this case, a maximum quantity of MIMO layers of the SN 1 on the band 9 cannot exceed 8, that is, a maximum quantity of MIMO layers configured for a cell corresponding to the band 9 in the first configuration information cannot exceed 8. For example, the first configuration information indicates that a maximum quantity of MIMO layers configured for the cell corresponding to the band 9 is less than or equal to 8, or the first configuration information indicates that a maximum quantity of MIMO layers configured for the cell corresponding to the band 9 is less than or equal to 6.

In addition, the response to the first information may further include an identifier of the first frequency band.

It may be understood that when the SN 1 determines, based on the first information, that there is only the first frequency band for selection for the SN 1, the SN 1 may not feed back the identifier of the first frequency band to the MN. However, when the SN 1 determines, based on the first information, that there is more than the first frequency band for selection for the SN 1, the SN 1 feeds back the identifier of the first frequency band to the MN.

Step 440: The MN receives a response to the second information from the SN 2, where the response to the second information includes second configuration information, and the second configuration information is used by the SN 2 to establish a connection to the terminal device. Step 440 is similar to step 430. For specific content, refer to related descriptions of step 430. Details are not described again.

In addition, a time sequence of step 430 and step 440 is not limited.

Step 450: The MN sends the first configuration information and the second configuration information to the terminal device.

For example, the first configuration information and the second configuration information may be placed in a container, and forwarded by the MN to the terminal device.

In addition, the MN may further send, to the terminal device, configuration information generated by the MN for the terminal device, for example, MCG configuration information, where the MCG configuration information includes cell group configuration information on the MN side.

Step 460: The terminal device sends the response to the first configuration information and the response to the second configuration information to the MN.

The response to the first configuration information indicates that the terminal device successfully performs a related action or configures related content based on the first configuration information. For example, the terminal device may generate an RCL entity and a MAC entity based on the first configuration information, and configure the RLC entity and the MAC entity.

The response to the second configuration information indicates that the terminal device successfully performs a related action or configures related content based on the second configuration information.

It may be understood that, after the terminal device receives the first configuration information and the second configuration information, the terminal device may initiate a random access procedure to the SN 1 and/or the SN 2. A sequence between initiating, by the terminal device, a random access procedure to the SN 1 and sending, by the terminal device, the response to the first configuration information to the MN is not limited, and a sequence between initiating, by the terminal device, a random access procedure to the SN 2 and sending, by the terminal device, the response to the second configuration information to the MN is not limited. In addition, a sequence and an occasion of initiating, by the terminal device, a random access procedure to the SN 1 and the SN 2 are not limited.

For step 450 and step 460, in a first implementation, the MN may separately send the first configuration information and the second configuration information to the terminal device. For example, the first configuration information and the second configuration information may be carried in different RRC messages. The terminal device may separately send the response to the first configuration information and the response to the second configuration information to the MN. For example, the response to the first configuration information and the response to the second configuration information may be carried in different RRC messages.

In a second implementation, the MN may send a first RRC message to the terminal device, where the first RRC message includes the first configuration information and the second configuration information. The terminal device may send a second RRC message to the MN, where the second RRC message includes the response to the first configuration information and the response to the second configuration information. For example, the first RRC message is an RRC reconfiguration message, and the second RRC message is an RRC reconfiguration complete message.

For the second implementation, the terminal device distinguishes between the first configuration information and the second configuration information based on the first RRC message, and the MN determines, based on the second RRC message, a correspondence between the SN 1 and the SN 2 and the response to the first configuration information and the response to the second configuration information.

In an example, the first RRC message further includes first indication information and second indication information. The first indication information indicates that the first configuration information is configured by the SN 1 for the terminal device, and the second indication information indicates that the second configuration information is configured by the SN 2 for the terminal device. Correspondingly, the second RRC message further includes third indication information and fourth indication information, the third indication information indicates the response to the first configuration information corresponds to the SN 1, and the fourth indication information indicates the response to the second configuration information corresponds to the SN 2. Therefore, the terminal device may identify, based on the first indication information, that the first configuration information is from the SN 1, and identify, based on the second indication information, that the second configuration information is from the SN 2. The MN may identify the response to the first configuration information based on the third indication information, and forward the response to the SN 1, and identify the response to the second configuration information based on the fourth indication information, and forward the response to the SN 2.

For example, the first indication information may include an identifier of a cell group corresponding to the SN 1, an identifier of a PSCell in the SN 1, or another identifier that can indicate that the first configuration information is configured by the SN 1 for the terminal device. Similarly, the second indication information may include an identifier of a cell group corresponding to the SN 2, an identifier of a PSCell in the SN 2, or another identifier that can indicate that the second configuration information is configured by the SN 2 for the terminal device. Correspondingly, the third indication information may carry an identifier that is the same as that of the first indication information, and the fourth indication information may carry an identifier that is the same as that of the second indication information.

In another example, a location of the first configuration information in the first RRC message is in one-to-one correspondence with a location of the response to the first configuration information in the second RRC message, and a location of the second configuration information in the first RRC message is in one-to-one correspondence with a location of the response to the second configuration information in the second RRC message.

Therefore, the terminal device may distinguish between the first configuration information and the second configuration information based on a difference between the location of the first configuration information in the first RRC message and the location of the second configuration information in the first RRC message. The MN may distinguish between the response to the first configuration information and the response to the second configuration information based on a difference between the location of the response to the first configuration information in the second RRC message and the location of the response to the second configuration information in the second RRC message. Because the location of the first configuration information in the first RRC message is in one-to-one correspondence with the location of the response to the first configuration information in the second RRC message, and the location of the second configuration information in the first RRC message is in one-to-one correspondence with the location of the response to the second configuration information in the second RRC message, the MN may identify, based on the correspondence, which response is the response to the first configuration information and forward the response to the SN 1, and identify which response is the response to the second configuration information and forward the response to the SN 2.

For example, an information element (IE) in which the first configuration information is located is different from an IE in which the second configuration information is located (for example, locations of two IEs in the first RRC message are different), an IE in which the response to the first configuration information is located is different from an IE in which the response to the second configuration information is located (for example, locations of two IEs in the second RRC message are different), the IE in which the first configuration information is located is in one-to-one correspondence with the IE in which the response to the first configuration information, and the IE in which the second configuration information is located is in one-to-one correspondence with the IE in which the response to the second configuration information.

Step 470: The MN sends the response to the first configuration information to the SN 1.

Step 480: The MN sends the response to the second configuration information to the SN 2.

It may be understood that a sequence of step 470 and step 480 is not limited herein.

In addition, in some implementations, the MN may further send fifth indication information to the SN 1, where the fifth indication information indicates an identifier of an SN other than the SN 1 that is configured by the MN for the terminal device, and the fifth indication information includes an identifier of the SN 2. In addition, a quantity of identifiers included in the fifth indication information depends on a quantity of SNs. For example, if the MN further adds another SN before adding the SN 1, the fifth indication information may further include an identifier of the another SN.

Further, when signal quality of a PSCell of the terminal device in the SN 1 is lower than a first preset threshold, the SN 1 may trigger the terminal device to hand over to another SN. For example, the SN 1 may determine, based on whether the MN configures an identifier of an SN other than the SN 1 for the terminal device, whether to trigger an SN release procedure or an SN change procedure.

For example, if the SN 1 determines that the signal quality of the PSCell of the terminal device in the SN 1 is lower than the first preset threshold, and the SN 1 has obtained the identifier of the SN 2 based on the fifth indication information, to learn that the MN has configured the SN 2 for the terminal device, the SN 1 may directly trigger an SN 1 release procedure. If the SN 1 does not obtain the identifier of the SN 2, and signal quality of a cell B in the SN 2 is higher than a second preset threshold, where the first preset threshold is less than the second preset threshold, the SN 1 may trigger an SN change procedure. In this case, the SN 1 may send the identifier of the SN 2 to the MN, the MN determines that the SN 2 has been added, and the SN 2 may be activated to provide a service for the terminal device. Alternatively, if the SN 1 does not obtain an identifier of a third node, and signal quality of a cell of the terminal device in the third node is higher than a second preset threshold, where the first preset threshold is less than the second preset threshold, the SN 1 may trigger an SN change procedure, and the SN 1 may send the identifier of the third node to the MN. If the MN determines that the third node is not added as the SN, the MN may add the third node to provide a service for the terminal device.

Similarly, the MN may further send sixth indication information to the SN 2, where the sixth indication information indicates an identifier of an SN other than the SN 2 that is configured by the MN for the terminal device, and the sixth indication information includes an identifier of the SN 1.

According to the embodiment shown in FIG. 4, in the scenario shown in Case 1, frequency bands used by the plurality of SNs are different and are in a same frequency band combination, to improve capability configuration efficiency of the terminal device, so that the terminal device can correctly execute configuration information generated by the plurality of SNs for the terminal device, and a procedure of adding an SN is successfully completed. In this way, the terminal device can normally communicate with the plurality of SNs, and communication quality of the terminal device in a multi-connectivity communication process is improved.

Figure 5:
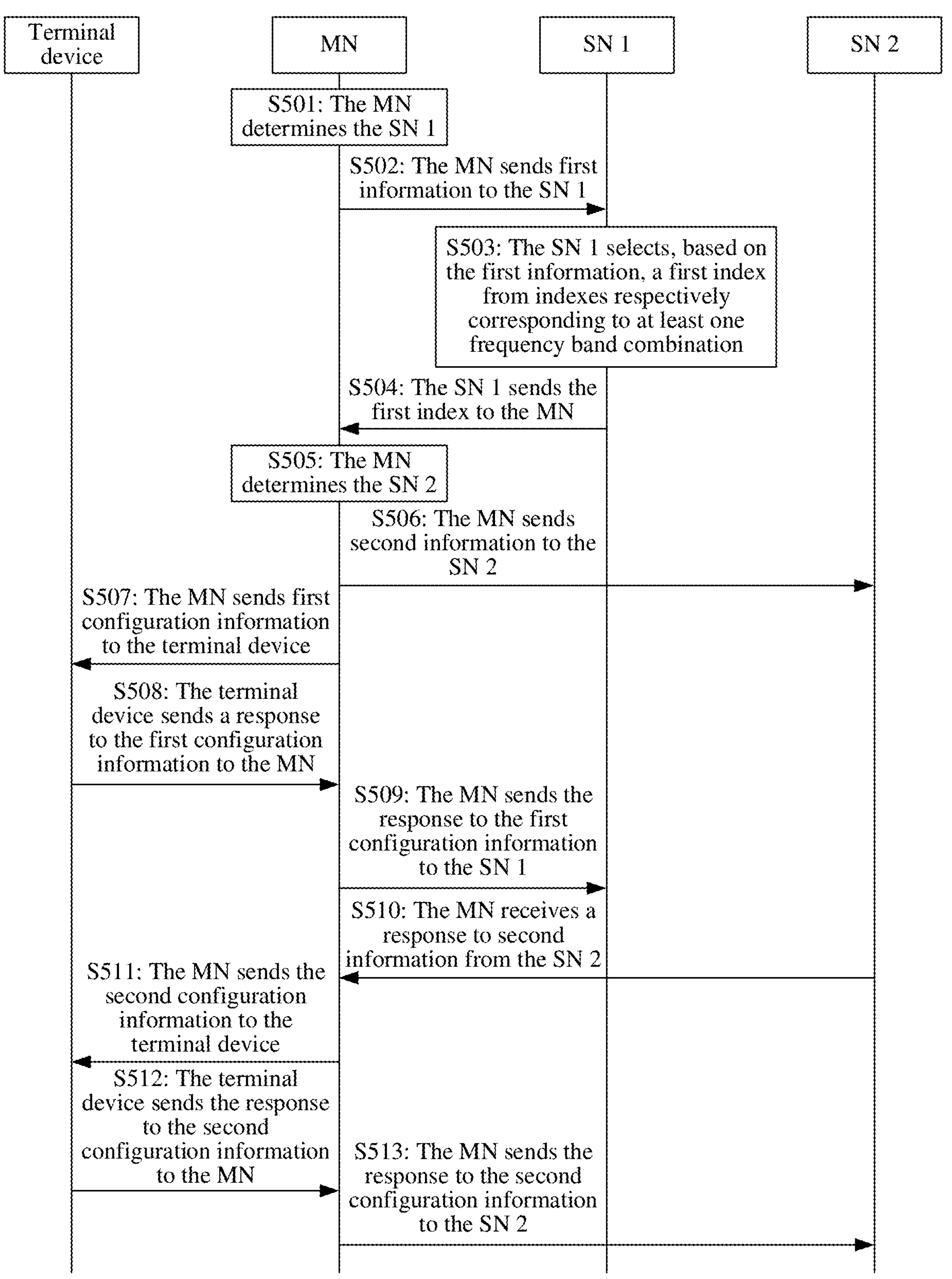
FIG. 5 is an overview flowchart 2 of a multi-connectivity communication method according to an embodiment.

The following describes the communication method provided in the embodiments by using Case 2 as an example, to resolve a problem that a conflict occurs between frequency bands selected by a plurality of SNs in MR-MC, as shown in FIG. 5. For example, in the embodiment shown in FIG. 5, an MN first initiates adding of an SN 1, and then initiates adding of an SN 2.

S501: The MN determines the SN 1.

For a specific manner of determining the SN 1 by the MN, refer to related descriptions in step 400. Details are not described again.

S502: The MN sends first information to the SN 1, where the first information is used by the SN 1 to select a first frequency band, and the first information includes indexes respectively corresponding to at least one frequency band combination supported by the terminal device. For example, the first information may be included in an SN addition request message. For example, the terminal device supports K frequency band combinations, where K is an integer, and the first information includes indexes respectively corresponding to N frequency band combinations, where N is an integer, and $N \leq K$.

S503: The SN 1 selects, based on the first information, a first index from indexes respectively corresponding to at least one frequency band combination.

S504: The SN 1 sends the first index to the MN. The first index indicates a first frequency band combination supported by the terminal device.

For descriptions of the first index and the first frequency band combination, refer to related content in the foregoing embodiment.

It should be noted that a specific manner of determining the first index by the SN 1 is not limited. In some implementations, the SN 1 may select the first index based on at least one of a frequency band supported by the SN 1, a frequency band combination, and signal quality of the terminal device in a cell corresponding to each frequency band. For example, the SN 1 may randomly select one frequency band combination, that is, the first frequency band combination, from the at least one frequency band combination. For another example, the SN 1 may determine, from the at least one frequency band combination based on the frequency band supported by the SN 1, a frequency band combination including the frequency band supported by the SN 1, and then randomly select a frequency band combination, that is, the first frequency band combination, from the frequency band combination including the frequency band supported by the SN 1. Further, for a specific manner in which the SN 1 determines the first frequency band from the first frequency band combination, refer to related paragraphs in the embodiment shown in FIG. 4.

For example, the SN 1 may send a response to the first information to the MN, and the response to the first information includes the first index. In addition, the response to the first information further includes first configuration information. The first configuration information is used by the SN 1 to establish a connection to the terminal device. For related descriptions of the first configuration information, refer to step 430. Details are not described again. The first index corresponds to the first frequency band combination.

Generally, the SN 1 further sends an identifier of the first frequency band to the MN. For example, the response to the first information further includes the identifier of the first frequency band.

S505: The MN determines the SN 2.

For example, after the MN adds the SN 1 (that is, after receiving the response to the first information), the MN may determine the SN 2 by using the foregoing method for determining the SN 1. Alternatively, after adding the SN 1, the MN may receive an SN addition request from the SN 1, where the SN addition request includes an identifier of the SN 2, and the MN determines the SN 2 based on the identifier of the SN 2. It should be noted that a specific manner of determining the SN 2 by the SN 1 is not limited.

S506: The MN sends second information to the SN 2, where the second information is used by the SN 2 to select a second frequency band, and the second information includes the first index. For example, the second information is included in the SN addition request message.

The first frequency band and the second frequency band are in the first frequency band combination, and the first frequency band and the second frequency band are different.

In an example, the MN may determine, based on the first index and the identifier of the first frequency band, an identifier of a frequency band available to the SN 2 in the first frequency band combination, and the second information includes the first index and the identifier of the frequency band available to the SN 2 in the first frequency band combination.

For example, the frequency band combination supported by the terminal device is shown in Table 1A. The MN sends the first information to the SN 1, and the first information includes an index 1 and an index 2. A frequency band combination corresponding to the index 1 and a frequency band combination corresponding to the index 2 are two frequency band combinations supported by the terminal device. The SN 1 selects, based on the first information, the frequency band combination corresponding to the index 1, and sends the frequency band combination index 1 and an identifier of the band 6 to the MN. The MN determines the second information based on the index 1, the identifier of the band 6, and Table 1A, and sends the second information to the SN 2, where the second information includes the frequency band combination index 1 and an identifier of the band 9. The SN 2 may determine the band 9 based on the second information.

In another example, the MN determines the second information based on the first index, the identifier of the first frequency band, and an identifier of a frequency band that is in the first frequency band combination and that has been allocated or pre-allocated to the MN, where the second information includes the first index, the frequency band that is in the first frequency band combination and that has been allocated or pre-allocated to the MN, and the identifier of the first frequency band. Alternatively, the MN determines the second information based on the first index and the identifier of the first frequency band, where the second information includes the first index and the identifier of the first frequency band.

Therefore, the second information includes the first index and an identifier of a frequency band unavailable to the SN 2 in the first frequency band combination.

For example, the frequency band combination supported by the terminal device is shown in Table 2. The MN sends the first information to the SN 1, and the first information includes an index 1 and an index 2. A frequency band combination corresponding to the index 1 and a frequency band combination corresponding to the index 2 are two frequency band combinations supported by the terminal device. The SN 1 selects, based on the first information, the frequency band combination 1 corresponding to the index 1, and sends the frequency band combination index 1 and an identifier of the band 6 to the MN. The MN determines the second information based on the index 1, the identifier of the band 6, and an identifier of a frequency band (for example, an identifier of the band 1) selected by the MN from the frequency band combination corresponding to the frequency index 1, and sends the second information to the SN 2, where the second information includes the frequency band combination index 1, the identifier of the band 1, and the identifier of the band 6. The SN 2 may determine, based on Table 2 and the second information, that a frequency band selection range of the SN 2 is the band 2, the band 5, the band 7, and the band 9, and the SN 2 selects a frequency band in the selection range.

Therefore, in the foregoing manner of configuring the first information and the second information, the frequency band combination selected by the SN 1 is the same as the frequency band combination selected by the SN 2, and the first frequency band is different from the second frequency band, to improve capability configuration efficiency of the terminal device, and ensure normal communication between the terminal device and each SN.

In addition, it may be understood that the first information indicates the capability of the terminal device available to the SN 1. Therefore, in addition to being used by the SN 1 to select the first frequency band, the first information may further indicate a capability of another terminal device available to the SN 1. In some implementations, the first information further includes at least one of the following: information about at least one feature set combination associated with each of the at least one frequency band combination, a maximum transmit power of the terminal device on the SN 1 side, an identifier of a serving cell available to the SN 1, and a PDCCH blind detection capability that is allowed to be configured by the SN 1 for the terminal device.

Similarly, the second information indicates the capability of the terminal device available to the SN 2. Therefore, in addition to being used by the SN 2 to select the second frequency band, the second information may further indicate a capability of another terminal device available to the SN 2. The SN 1 sends the first index to the MN, and the MN determines the second information based on the first index. In this case, the second information includes at least one of the following: information about a feature set combination associated with the first frequency band combination (that is, does not need to include information about a feature set combination associated with another frequency band combination), a maximum transmit power of the terminal device on the SN 2 side, an identifier of a serving cell available to the SN 2, and a PDCCH blind detection capability that is allowed to be configured by the SN 2 for the terminal device.

It should be noted that, if the first information further includes the information about at least one feature set combination associated with each of the at least one frequency band combination, the SN 1 further sends, to the MN, an index of the feature set combination that is selected by the SN 1 and that is associated with the first frequency band combination. For example, the response to the first information further includes the index of the feature set combination that is selected by the SN 1 and that is associated with the first frequency band combination. Further, the second information further includes the index of the feature set combination that is selected by the SN 1 and that is associated with the first frequency band combination.

For example, the frequency band combination supported by the terminal device is shown in Table 2. The first information includes an index 1 and an index 2. A frequency band combination corresponding to the index 1 and a frequency band combination corresponding to the index 2 are two frequency band combinations supported by the terminal device. The first information further includes feature set combination indexes {2, 3, 4} associated with the frequency band combination corresponding to the index 1, and feature set combination indexes {1, 4} associated with the frequency band combination corresponding to the index 2. When the SN 1 selects a frequency band combination corresponding to the index 1, the SN 1 may select a feature set combination index {2} from the feature set combination indexes {2, 3, 4} associated with the frequency band combination corresponding to the index 1. For example, an example in which the feature set combination corresponding to the index 1 shown in the second row in Table 3 is an index {2} is used. When a frequency band selected by the SN 1 is the band 6, the SN 1 determines, based on the feature set combination index {2}, a feature set 2 in a feature set corresponding to the band 6. The SN 1 further sends, to the MN, the feature set combination index {2} associated with the frequency band combination corresponding to the index 1, so that the second information further includes the feature set combination index {2} associated with the frequency band combination corresponding to the index 1, so that the SN 2 determines, based on the feature set combination index {2}, a feature set in a feature set corresponding to the frequency band selected by the SN 2.

It should be noted that, in addition to the foregoing content related to the feature set combination, for the capability of the another terminal device available to the SN 1 indicated by the first information and the capability of the another terminal device available to the SN 2 indicated by the second information, refer to related descriptions in the embodiment shown in FIG. 4.

Optionally, after S505, the method may further include the following steps.

S507: The MN sends first configuration information to the terminal device.

It may be understood that, S507 is performed after S504, and a time sequence between S507 and S505 and S506 is not limited.

S508: The terminal device sends a response to the first configuration information to the MN.

S509: The MN sends the response to the first configuration information to the SN 1.

S510: The MN receives a response to the second information from the SN 2, where the response to the second information includes second configuration information, and the second configuration information is used by the SN 2 to establish a connection to the terminal device.

In addition, the response to the second information may further include an identifier of the second frequency band.

S511: The MN sends the second configuration information to the terminal device.

S512: The terminal device sends a response to the second configuration information to the MN.

S513: The MN sends the response to the second configuration information to the SN 2.

It may be understood that S507 to S509 and S510 to S513 are mutually independent processes. For specific meanings of the foregoing steps, refer to related descriptions of the embodiment shown in FIG. 4.

In addition, the MN may further send fifth indication information to the SN 1, where the fifth indication information indicates an identifier of an SN other than the SN 1 that is configured by the MN for the terminal device, and the fifth indication information includes an identifier of the SN 2. The MN may further send sixth indication information to the SN 2, where the sixth indication information indicates an identifier of an SN other than the SN 2 that is configured by the MN for the terminal device, and the sixth indication information includes an identifier of the SN 1. For details, refer to related descriptions in the embodiment shown in FIG. 4. Details are not described again.

According to the embodiment shown in FIG. 5, in the scenario shown in Case 2, frequency bands used by the plurality of SNs are different and are in a same frequency band combination, to improve capability configuration efficiency of the terminal device, so that the terminal device can correctly execute configuration information generated by the plurality of SNs for the terminal device, and a procedure of adding an SN is successfully completed. In this way, the terminal device can normally communicate with the plurality of SNs, and communication quality of the terminal device in a multi-connectivity communication process is improved.

According to Case 1 and Case 2, the SN 1 and/or the SN 2 may further request the MN to modify or update the capability of the terminal device corresponding to the SN 1. Alternatively, the SN 1 and/or the SN 2 may further request the MN to modify or update configuration information related to the capability of the terminal device, or the SN 1 and/or the SN 2 may further request the MN to negotiate on the capability of the terminal device. When the SN 1 requests to modify the capability of the terminal device corresponding to the SN 1, the SN 2 may need to modify the capability of the terminal device corresponding to the SN 2.

The capability of the terminal device corresponding to the SN 1 may also be described as a capability of the terminal device currently used by the SN 1 or a capability of the terminal device selected by the SN 1. With reference to the foregoing related description of the capability of the terminal device, the capability of the terminal device corresponding to SN 1 may include, but is not limited to, at least one of the following: a frequency band combination used by the SN 1, a frequency band in the first frequency band combination used by the SN 1, a feature set combination that is used by the SN 1 and that is associated with the first frequency band combination, a maximum transmit power of the terminal device on the SN 1 side, an identifier of a serving cell available to the SN 1, or a PDCCH blind detection capability that is allowed to be configured by the SN 1 for the terminal device. It may be understood that the capability of the terminal device corresponding to the SN 1 may be determined by the SN 1 based on the first information, that is, may be determined based on the capability of the terminal device available to the SN 1.

For example, the frequency band combination supported by the terminal device is shown in Table 1A. The first information may include an index 1, an identifier of the band 9, an identifier of the band 6, and a feature set combination index {2}. In this case, the capability of the terminal device corresponding to the SN 1 may include a frequency band combination used by the SN 1 as a frequency band combination corresponding to the index 1, the band 9 in the frequency band combination corresponding to the index 1 used by the SN 1, and a feature set 5 in a feature set corresponding to the band 9 used by the SN 1.

For example, the frequency band combination supported by the terminal device is shown in Table 1A. The first information may include an index 1, an index 2, a feature set combination index {2} associated with a frequency band combination corresponding to the index 1, and feature set combination indexes {2, 3} associated with a frequency band combination corresponding to the index 2. In this case, the capability of the terminal device corresponding to the SN 1 may include a frequency band combination used by the SN 1 as a frequency band combination corresponding to the index 1, the band 9 in the frequency band combination corresponding to the index 1 used by the SN 1, and a feature set 5 in a feature set corresponding to the band 9 used by the SN 1.

For another example, the frequency band combination supported by the terminal device is shown in Table 1A. The first information may include an index 1, an identifier of the band 9, a feature set combination index {2}, maximum transmit power X1 of the terminal device on the SN 1 side, an identifier of a cell A (that is, an identifier of a serving cell available to the SN 1), and a quantity Y1 of PDCCHs corresponding to a PDCCH blind detection capability that is allowed to be configured by the SN 1 for the terminal device. In this case, the capability of the terminal device corresponding to the SN 1 includes a frequency band combination used by the SN 1 as a frequency band combination corresponding to the index 1, the band 9 in the frequency band combination corresponding to the index 1 used by the SN 1, a feature set 5 in a feature set corresponding to the band 9 used by the SN 1, the maximum transmit power X1 of the terminal device on the SN 1 side, the identifier of the serving cell available to the SN 1 including the identifier of the cell A, and the quantity Y1 of the PDCCHs corresponding to the PDCCH blind detection capability that is allowed to be configured by the SN 1 for the terminal device.

Similarly, the capability of the terminal device corresponding to the SN 2 may include, but is not limited to, at least one of the following: a frequency band combination used by the SN 2, a frequency band in the first frequency band combination used by the SN 2, a feature set combination that is used by the SN 2 and that is associated with the first frequency band combination, a maximum transmit power of the terminal device on the SN 2 side, an identifier of a serving cell available to the SN 2, or a PDCCH blind detection capability that is allowed to configure by the SN 2 for the terminal device. It may be understood that the capability of the terminal device corresponding to the SN 2 may be determined by the SN 2 based on the second information.

Figure 6:
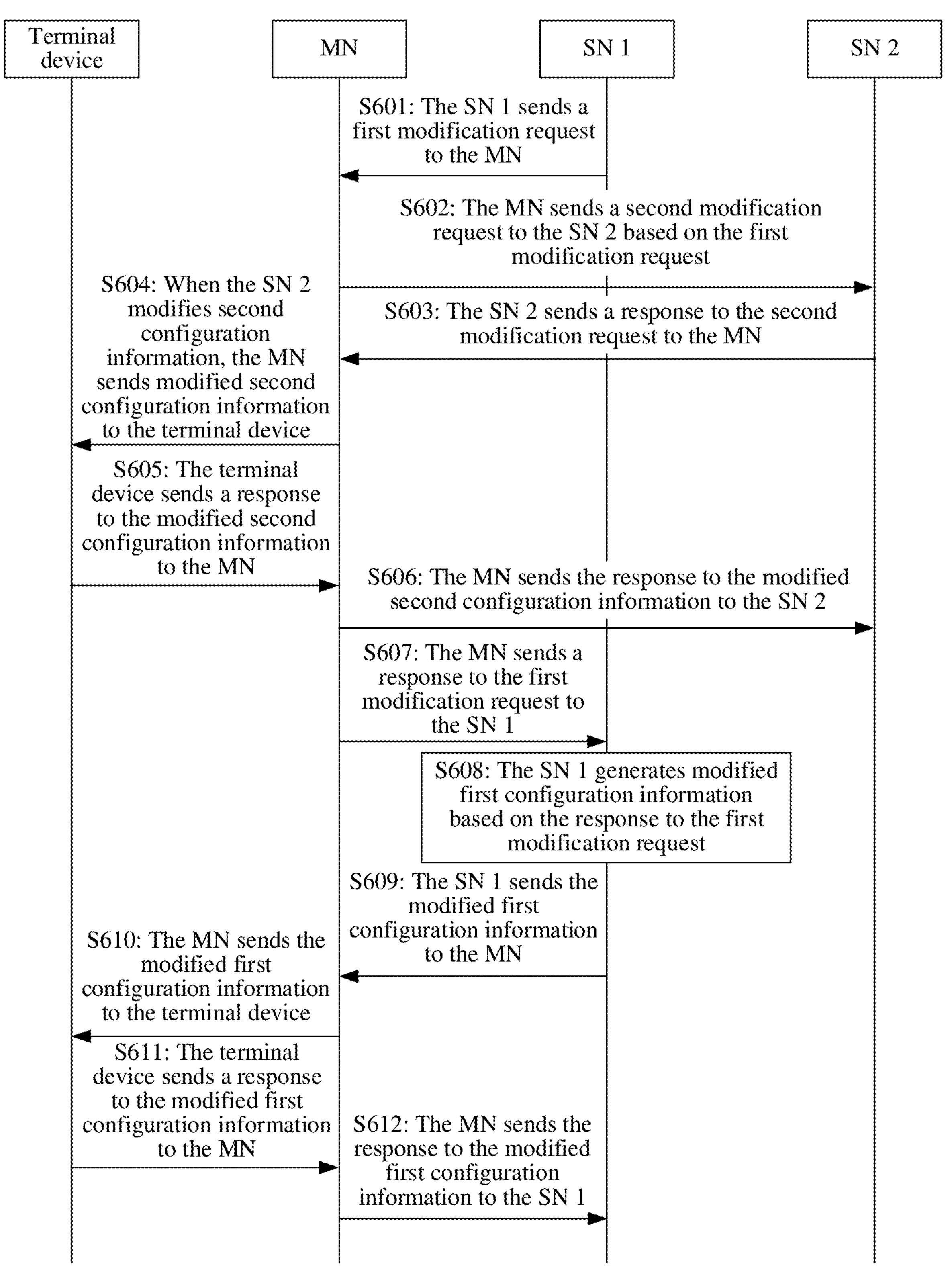
FIG. 6 is a schematic diagram in which an SN 1 requests an MN to modify a capability of a terminal device corresponding to the SN 1 according to an embodiment.

The following uses FIG. 6 as an example to describe a schematic diagram in which an SN 1 requests an MN to modify a capability of a terminal device corresponding to the SN 1. It may be understood that the procedure shown in FIG. 6 is performed after the MN completes the procedure of adding the SN 1 and the SN 2, that is, after the procedure shown in FIG. 4 or FIG. 5.

S601: The SN 1 sends a first modification request to the MN, where the first modification request is used to request to modify a first option, and the first option includes one or more of capabilities of the terminal device corresponding to the SN 1.

S602: The MN sends a second modification request to the SN 2 based on the first modification request, where the second modification request is used to modify a second option, the first option is associated with the second option, and the second option is one or more of capabilities of the terminal device corresponding to the SN 2.

For example, a type of the capability of the terminal device that is indicated by the first option is the same as a type of the capability of the terminal device that is indicated by the second option. For example, the first option is a maximum transmit power of the terminal device on the SN 1 side, and the second option is a maximum transmit power of the terminal device on the SN 2 side. For another example, the first option is a feature set combination that is used by the SN 1 and that is associated with a first frequency band combination, and the second option is a feature set combination that is used by the SN 2 and that is associated with the first frequency band combination.

Optionally, S603: The SN 2 may send a response to the second modification request to the MN, where the response to the second modification request indicates a modified second option.

In addition, the response to the second modification request may further include modified second configuration information.

It should be noted that when the SN 2 modifies the second option, the SN 2 may modify the second configuration information, or when the SN 2 modifies the second option, the SN 2 may not need to modify the second configuration information.

For example, the first option is the maximum transmit power of the terminal device on the SN 1 side, the maximum transmit power of the terminal device on the SN 1 side is X1, the second option is the maximum transmit power of the terminal device on the SN 2 side, and the maximum transmit power of the terminal device on the SN 2 side is X2, where $X1+X2<W$, and W represents the maximum transmit power of the terminal device. The SN 1 sends the first modification request to the MN, where the first modification request is used to request the MN to modify the maximum transmit power of the terminal device on the SN 1 side from X1 to X3, where $X3>X1$. W may be a maximum transmit power of the terminal device after the transmit power of the terminal device on the MN side is deducted. It may be understood that the MN may also adjust the maximum transmit power of the terminal device on the MN side. For brevity, the following discussion is performed only by assuming that the MN does not change the maximum transmit power of the terminal device on the MN side.

If $X3+X2<W$, the MN may not need to send the second modification request to the SN 2. The MN may reconfigure the first option for the SN 1.

If $X3+X2>W$, the MN sends the second modification request to the SN 2 based on the first modification request, where the second modification request indicates the SN 2 to modify the second option. The SN 2 modifies the maximum transmit power of the terminal device on the SN 2 side from X2 to X4, where $X4<X2$, and $X3+X4<W$.

The second configuration information indicates that the maximum transmit power of the terminal device on the SN 2 side is Z, where $Z \leq X2$.

If $X3+Z<W$ and $Z \leq X4$, the SN 2 may not need to modify the second configuration information.

If $X3+Z>W$, the SN 2 needs to modify the second configuration information, and the modified second configuration information indicates that the maximum transmit power of the terminal device on the SN 2 side is Z*, where $Z^*<X4$.

It can be learned from the foregoing that whether the SN 2 needs to modify the second configuration information depends on both the modified second option and the original second option.

S604: When the SN 2 modifies the second configuration information, the MN sends the modified second configuration information to the terminal device.

S605: The terminal device sends a response to the modified second configuration information to the MN.

S606: The MN sends the response to the modified second configuration information to the SN 2.

S607: The MN may further send a response to the first modification request to the SN 1, where the response to the first modification request indicates that the first modification request of the SN 1 is accepted or indicates a first option that can be modified by the SN 1.

For example, with reference to the foregoing example, when the first modification request is used to request the MN to modify the maximum transmit power of the terminal device on the SN 1 side from X1 to X3, the response to the first modification request indicates that the MN agrees to modify the maximum transmit power of the terminal device on the SN 1 side from X1 to X3, or indicates to modify the maximum transmit power of the terminal device on the SN 1 side from X1 to X5, for example, $X5>X1$, where X5 may be greater than X3 or less than X3. This is not limited.

S608: The SN 1 may generate modified first configuration information based on the response to the first modification request.

For example, with reference to the foregoing example, when the first modification request is used to request the MN to modify the maximum transmit power of the terminal device on the SN 1 side from X1 to X3, and the response to the first modification request indicates that the MN agrees to modify the maximum transmit power of the terminal device on the SN 1 side from X1 to X3, the SN 1 modifies the first configuration information, so that the terminal device increases the transmit power to send a signal to the SN 1.

It may be understood that the SN 1 may modify the first option only based on the response to the first modification request, and does not need to modify the first configuration information. This is similar to S603 herein, and details are not described again.

S609: If the SN 1 generates modified first configuration information, the SN 1 sends the modified first configuration information to the MN.

S610: The MN sends the modified first configuration information to the terminal device.

S611: The terminal device sends a response to the modified first configuration information to the MN.

S612: The MN sends a response to the modified first configuration information to the SN 1.

It may be understood that S604 to S606 and S607 to S612 are mutually independent processes.

For example, a frequency band combination supported by the terminal device is shown in Table 2. The SN 1 currently communicates with the terminal device over the band 6 in a frequency band combination corresponding to the index 1, and the SN 2 currently communicates with the terminal device over the band 7 in a frequency band combination corresponding to the index 1. It is assumed that the feature set combination associated with the frequency band combination corresponding to the frequency band combination index 1 is a feature set combination corresponding to the feature set combination index {1} shown in the first row of Table 3.

The SN 1 sends the first modification request to the MN, where the first modification request is used to request to modify the frequency band used by the SN 1 to the band 7 in a frequency band combination corresponding to the frequency band combination index 1. For example, the first modification request includes an identifier of the band 7, and the MN sends a second modification request to the SN 2, where the second modification request includes an identifier of the band 9 and an identifier of the band 5 in the frequency band combination corresponding to the frequency band combination index 1. The SN 2 selects, based on the second modification request, the band 9 in a frequency band combination corresponding to the frequency band combination index 1 as a frequency band for communication with the terminal device. The SN 2 determines, based on Table 3 and the feature set combination index {1}, a feature set 6 in a feature set corresponding to the band 9, and generates the modified second configuration information based on the feature set 6. The SN 2 sends the response to the second modification request to the MN, where the response to the second modification request includes the modified second configuration information and the identifier of the band 9. The MN sends the modified second configuration information to the terminal device, receives the response to the modified second configuration information from the terminal device, and sends the response to the modified second configuration information to the SN 2. In addition, the MN may further send the response to the first modification request to the SN 1, where the response to the first modification request indicates an identifier of the band 7. The SN 1 may determine, based on Table 3 and the feature set combination index {1}, a feature set 1 in a feature set corresponding to the band 7, and generate the modified first configuration information based on the feature set 1. The SN 1 sends the modified first configuration information to the MN. The MN sends the modified first configuration information to the terminal device, receives the response to the modified first configuration information from the terminal device, and sends the response to the modified first configuration information to the SN 1.

According to the method provided in the embodiment shown in FIG. 6, the SN 1 may negotiate, via the MN, with the SN 2 on the capability of the terminal device.

Figure 7:
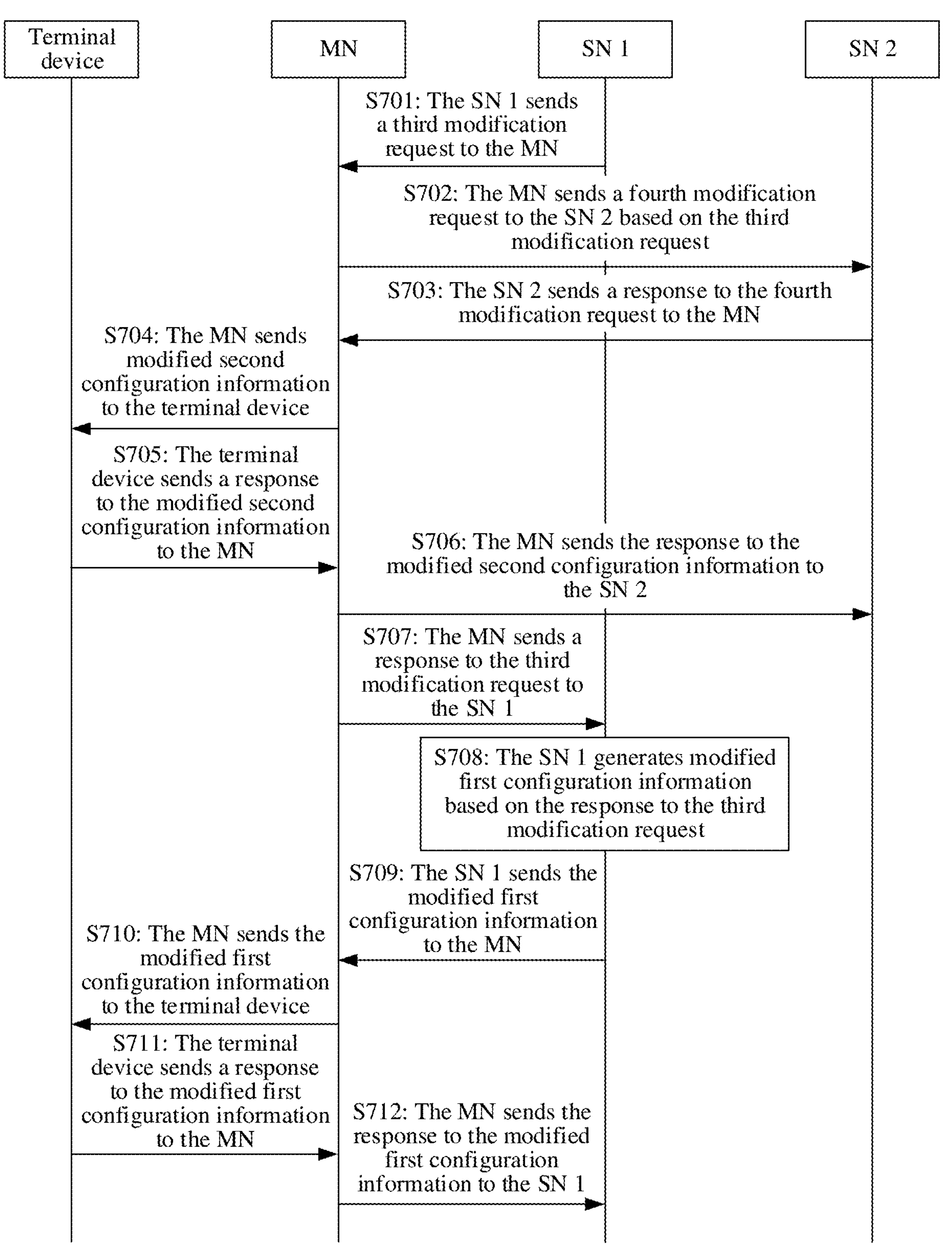
FIG. 7 is a schematic diagram in which an SN 1 requests an MN to modify first configuration information according to an embodiment.

According to Case 1 and Case 2, the following uses FIG. 7 as an example to describe a schematic diagram in which an SN 1 requests an MN to modify first configuration information. It may be understood that the procedure shown in FIG. 7 is performed after the MN completes the procedure of adding the SN 1 and the SN 2, that is, after the procedure shown in FIG. 4 or FIG. 5.

It should be noted that, in the embodiment shown in FIG. 7, when the SN 1 modifies the first configuration information, a capability of a terminal device corresponding to the SN 1 remains unchanged. In other words, a change of the capability of the terminal device corresponding to the SN 1 is not involved. For example, the SN 1 may modify a DRB bearer for the terminal device. For example, when load of the SN 1 exceeds a preset load threshold, the SN 1 may request to change the bearer from being carried by the SN 1 to the SN 2.

S701: The SN 1 may further send a third modification request to the MN, where the third modification request is used to request to modify the first configuration information.

S702: The MN sends a fourth modification request to the SN 2 based on the third modification request, where the fourth modification request indicates the SN 2 to modify second configuration information.

Optionally, S703: The SN 2 may send a response to the fourth modification request to the MN, where the response to the fourth modification request includes modified second configuration information.

S704: The MN sends the modified second configuration information to the terminal device.

S705: The terminal device sends a response to the modified second configuration information to the MN.

S706: The MN sends the response to the modified second configuration information to the SN 2.

S707: The MN may further send a response to the third modification request to the SN 1. The response to the third modification request indicates the SN 1 to modify the first configuration information.

S708: The SN 1 may generate modified first configuration information based on the response to the third modification request.

S709: The SN 1 sends the modified first configuration information to the MN.

S710: The MN sends the modified first configuration information to the terminal device.

S711: The terminal device sends a response to the modified first configuration information to the MN.

S712: The MN sends a response to the modified first configuration information to the SN 1.

According to the method provided in the embodiment shown in FIG. 7, the first configuration information may be modified by the SN 1.

According to Case 1 and Case 2, after the SN 1 and the SN 2 are added, the MN may further add an SN 3. With reference to the embodiment shown in FIG. 6, adding of the SN 3 may cause the SN 1 to modify the capability of the terminal device corresponding to the SN 1, or modify the capability of the terminal device corresponding to the SN 1 and the first configuration information. Adding of the SN 3 may further cause the SN 2 to modify the capability of the terminal device corresponding to the SN 2, or modify the capability of the terminal device corresponding to the SN 2 and the second configuration information. It should be noted that, a main difference from the embodiment shown in FIG. 6 lies in that in this scenario, the MN determines whether the capability of the terminal device corresponding to the SN 1 and/or the capability of the terminal device corresponding to the SN 2 need/needs to be modified.

Figure 8:
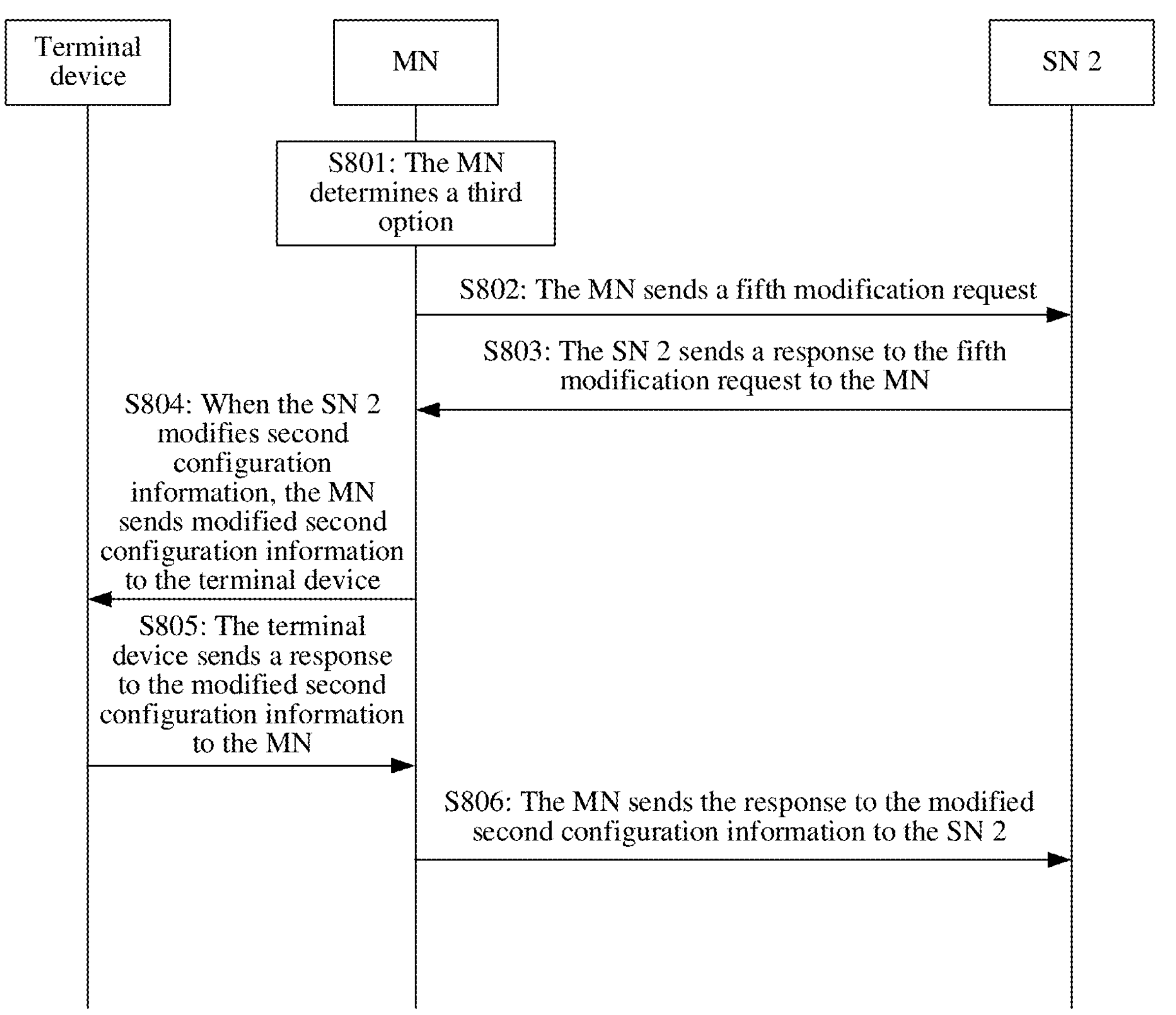
FIG. 8 is a schematic diagram in which an SN 2 modifies a capability of a terminal device corresponding to the SN 2 because an SN 3 is added according to an embodiment.

The following uses an example in which the SN 2 needs to modify the capability of the terminal device corresponding to the SN 2 because the SN 3 is added for description, as shown in FIG. 8.

S801: The MN determines a third option, where the third option is one or more of capabilities of the terminal device corresponding to the SN 2.

In some implementations, the MN may determine the third option based on the first information, the second information, and the third information.

For example, the frequency band combination supported by the terminal device is shown in Table 1A. The first information may include an index 1, an identifier of the band 9, a feature set combination index {2}, and a maximum transmit power X1 of the terminal device on the SN 1 side. In this case, the capability of the terminal device corresponding to the SN 1 includes a frequency band combination used by the SN 1 as a frequency band combination corresponding to the index 1, the band 9 in the frequency band combination corresponding to the index 1 used by the SN 1, a feature set 5 in a feature set corresponding to the band 9 used by the SN 1, and the maximum transmit power X1 of the terminal device on the SN 1 side.

The second information may include an index 1, an identifier of the band 6, a feature set combination index {2}, and a maximum transmit power X2 of the terminal device on the SN 2 side. In this case, the capability of the terminal device corresponding to the SN 2 includes a frequency band combination used by the SN 2 as a frequency band combination corresponding to the index 1, the band 6 in the frequency band combination corresponding to the index 1 used by the SN 2, a feature set 2 in a feature set corresponding to the band 6 used by the SN 2, and the maximum transmit power X2 of the terminal device on the SN 2 side.

The third information may include an index 1, an identifier of the band 7, a feature set combination index {2}, and a maximum transmit power X3 of the terminal device on the SN 3 side. In this case, the capability of the terminal device corresponding to the SN 3 includes a frequency band combination used by the SN 3 as a frequency band combination corresponding to the index 1, the band 7 in the frequency band combination corresponding to the index 1 used by the SN 3, a feature set 2 in a feature set corresponding to the band 7 used by the SN 3, and the maximum transmit power X3 of the terminal device on the SN 3 side.

$X1+X2<W$, W represents the maximum transmit power of the terminal device, and $X1+X2+X3>W$.

Further, the MN may determine, based on the first information, the second information, and the third information, that the third option is the maximum transmit power of the terminal device on the SN 2 side. It may be understood that the MN may further determine a fourth option, where the fourth option is the maximum transmit power of the terminal device on the SN 1 side, or the MN may further determine a third option and a fourth option. Herein, only the third option is used as an example for description.

S802: The MN sends a fifth modification request to the SN 2, where the fifth modification request is used to modify the third option.

Optionally, S803: The SN 2 may send a response to the fifth modification request to the MN, where the response to the fifth modification request indicates a modified third option.

In addition, the response to the fifth modification request may further include modified third configuration information.

This is similar to S603 herein, and details are not described again.

S804: When the SN 2 modifies the second configuration information, the MN sends the modified second configuration information to the terminal device.

S805: The terminal device sends a response to the modified second configuration information to the MN.

S806: The MN sends the response to the modified second configuration information to the SN 2.

According to the method provided in the embodiment shown in FIG. 8, when a new SN is added, the MN may negotiation with another SN on the capability of the terminal device.

Figure 9:
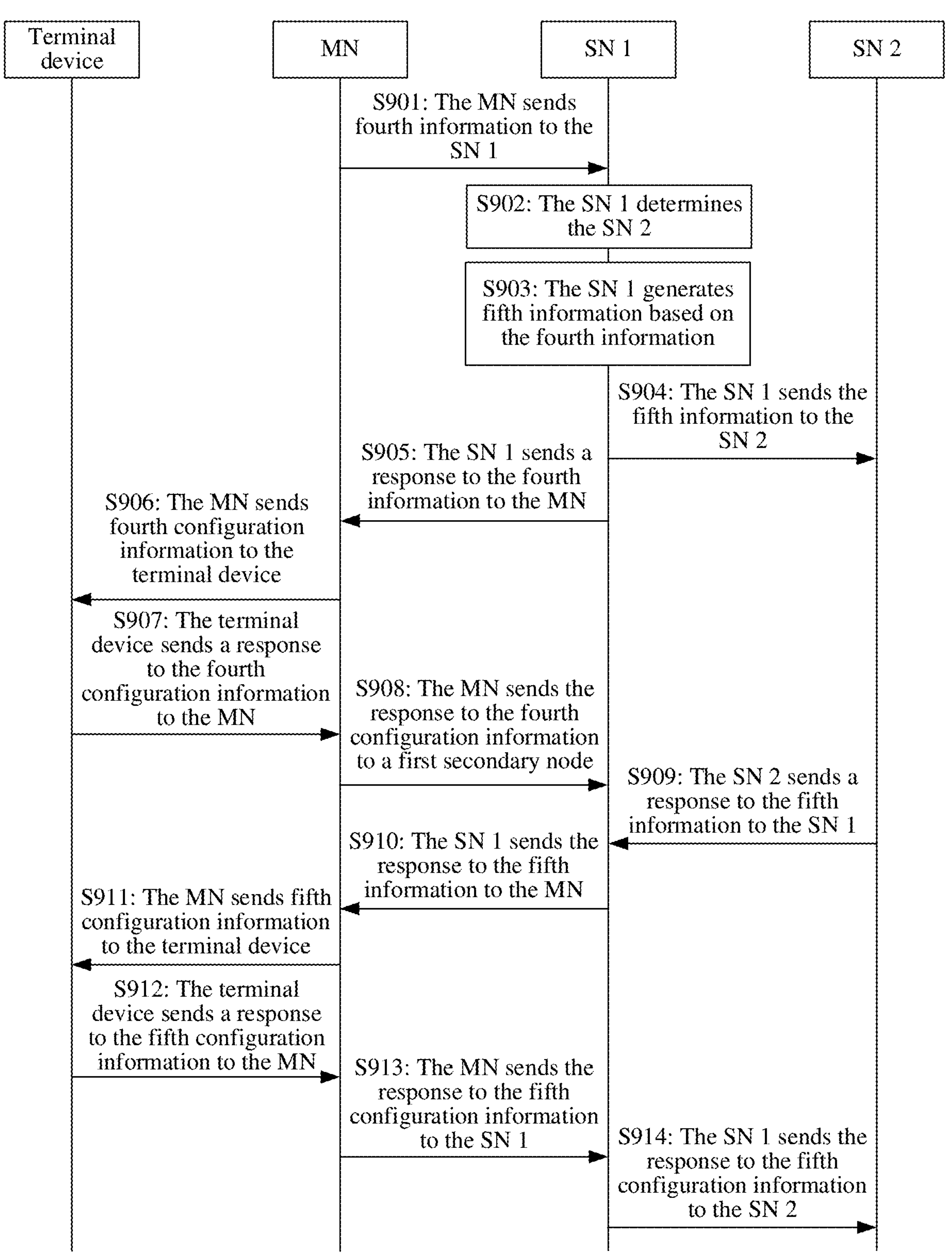
FIG. 9 is an overview flowchart 2 of a multi-connectivity communication method according to an embodiment.

The following describes the communication method provided in the embodiments by using Case 3 and Case 4 as examples, to resolve a problem that a conflict occurs between frequency bands selected by a plurality of SNs in MR-MC, as shown in FIG. 9.

S901: The MN sends fourth information to the SN 1, where the fourth information is used by the SN 1 to select a frequency band.

For example, the fourth information includes indexes respectively corresponding to N frequency band combinations supported by the terminal device, and the indexes respectively corresponding to the N frequency band combinations include a first index. The first index indicates a first frequency band combination supported by the terminal device.

The N frequency band combinations may be all frequency band combinations supported by the terminal device, or some frequency band combinations supported by the terminal device. When the N frequency band combinations are some frequency band combinations supported by the terminal device, a specific manner in which the MN determines the N frequency band combinations from all frequency band combinations supported by the terminal device is not limited. For example, the MN may determine the N frequency band combinations based on a frequency band supported by the SN 1 and/or a frequency band supported by the MN, or the MN may determine the N frequency band combinations based on a measurement result reported by the terminal device.

In addition, the fourth information further includes at least one of the following: information about at least one feature set combination respectively associated with the N frequency band combinations, a maximum transmit power of the terminal device on the SN 1 side, an identifier of a serving cell available to the SN 1, and a PDCCH blind detection capability that is allowed to be configured by the SN 1 for the terminal device. It should be noted that, in the fourth information, the maximum transmit power of the terminal device on the SN 1 side, the identifier of the serving cell available to the SN 1, and the PDCCH blind detection capability that is allowed to be configured by the SN 1 for the terminal device may also be allocated by the SN 1 to another SN for use, and this is not limited to being used only by the SN 1.

It may be understood that the fourth information indicates the capability of the terminal device available to the SN 1. The capability of the terminal device available to the SN 1 is not limited to being used only by the SN 1, and may be allocated by the SN 1 to another SN for use.

S902: The SN 1 determines an SN 2.

For example, the SN 1 may determine the SN 2 in the following manner, but is not limited to the following manner.

Manner A: The MN sends an identifier of the SN 2 to the SN 1, and the SN 1 determines the SN 2 based on the identifier of the SN 2. For example, the MN sends an SN addition request message to the SN 1, where the SN addition request message includes the identifier of the SN 2. For example, the SN addition request message may include a base station identifier of the SN 2 or an identifier of a cell in the SN 2. For a specific manner in which the MN determines the SN 2, refer to the foregoing embodiment.

In addition, the MN may further send a key of the SN 2 to the SN 1, or the SN 1 derives a key of the SN 2 based on a key of the SN 1. The SN 2 may encrypt, based on the key of the SN 2, downlink data sent to the terminal device through a PDCP layer of the SN 2, and decrypt uplink data received from the terminal device through the PDCP layer of the SN 2.

Manner B: The SN 1 determines to add the SN 2.

For example, the SN 1 may determine the SN 2 based on a measurement result that is sent by the MN to the SN 1 and that is of each cell by the terminal device. In addition, the SN 1 receives, from the MN, an identifier of another configured SN other than the SN 1, so that the SN 1 does not repeatedly send an SN addition request to a same SN.

S903: The SN 1 generates fifth information based on the fourth information.

S904: The SN 1 sends fifth information to the SN 2, where the fifth information is used by the SN 2 to select a frequency band. The frequency band selected by the SN 1 and the frequency band selected by the SN 2 are in a first frequency band combination.

Example 1: The SN 1 determines M frequency band combinations from the N frequency band combinations, where the fifth information includes indexes respectively corresponding to M frequency band combinations in the N frequency band combinations, and the indexes respectively corresponding to the M frequency band combinations include the first index, where $N \geq M \geq 1$. In this case, the SN 2 selects the first frequency band combination from the M frequency band combinations, selects the second frequency band from the first frequency band combination, and sends the first index and an identifier of the second frequency band to the SN 1.

A specific manner of determining the M frequency band combinations from the N frequency band combinations by the SN 1 is not limited, and a specific manner of determining the first frequency band combination and the second frequency band by the SN 2 is not limited.

For example, the first index and the identifier of the second frequency band may be carried in a response to the fifth information. Therefore, the SN 1 determines, based on the first index and the identifier of the second frequency band, to select the first frequency band from the first frequency band combination. The first frequency band is different from the second frequency band.

For example, the frequency band combination supported by the terminal device is shown in Table 2. The MN sends the fourth information to the SN 1, where the fourth information includes an index 1 to an index 5. The SN 1 determines the SN 2, and sends the index 1 to the index 3 to the SN 2. The SN 2 selects, from the frequency band combination index 1 to the frequency band combination index 3, a frequency band combination corresponding to the index 1, and selects the band 6 as a frequency band used by the terminal device for communication. The SN 2 sends the response to the fifth information to the SN 1, where the response to the fifth information includes the frequency band combination index 1, an identifier of the band 6, and the fifth configuration information. The SN 1 selects, based on the frequency band combination index 1 and the identifier of the band 6 that are included in the response to the fifth information, the band 7 as the frequency band used by the terminal device for communication, and generates the fourth configuration information.

For the fourth configuration information and the fifth configuration information, refer to related content of the first configuration information in step 430.

In addition, the fifth information further includes information about at least one feature set combination respectively associated with the M frequency band combinations.

In the foregoing example, the SN 1 sends indexes of some frequency band combinations in the at least one frequency band combination indicated by the fourth information to the SN 2, and the SN 2 selects the first frequency band combination and the second frequency band from the frequency band combinations, so that the SN 1 may select the first frequency band in the first frequency band combination based on the first frequency band combination and the second frequency band.

Example 2: The SN 1 selects the first frequency band combination from the N frequency band combinations, and selects the first frequency band from the first frequency band combination, where the fifth information includes the first index. In addition, the fifth information further includes an identifier of a frequency band available to the SN 2 in the first frequency band combination, or an identifier of a frequency band that has been selected by the SN 1 in the first frequency band combination.

For example, the frequency band combination supported by the terminal device is shown in Table 2. The MN sends the fourth information to the SN 1, where the fourth information includes an index 1 to an index 5. The SN 1 selects, from the index 1 to the index 5, a frequency band combination corresponding to the index 1, and selects the band 7 as a frequency band used by the terminal device for communication, to generate the fourth configuration information. The SN 1 determines the SN 2, and sends the index 1 and an identifier of the band 7 to the SN 2. The SN 2 selects, based on the index 1 and the identifier of the band 7, the band 6 as a frequency band used by the terminal device for communication. The SN 2 sends the response to the fifth information to the SN 1, where the response to the fifth information includes the identifier of the band 6 and the fifth configuration information.

In addition, the fifth information further includes information about a feature set combination associated with the first frequency band combination.

In the foregoing example, the SN 1 first selects one frequency band combination from the at least one frequency band combination indicated by the fourth information, and sends a frequency band combination index and a frequency band selected by the SN 1 (or a frequency band available to the SN 2) to the SN 2, so that the SN 2 and the SN 1 select a same frequency band combination, and the frequency band selected by the SN 1 is different from the frequency band selected by the SN 2.

In addition, for Example 1 and Example 2, the fifth information further includes at least one of a maximum transmit power of the terminal device on the SN 2 side, an identifier of a serving cell available to the SN 2, and a PDCCH blind detection capability that is allowed to be configured by the SN 2 for the terminal device. The maximum transmit power of the terminal device on the SN 2 side in the fifth information is less than or equal to the maximum transmit power of the terminal device on the SN 1 side in the fourth information, the identifier of the serving cell available to the SN 2 belongs to the identifier of the serving cell available to the SN 1, and the PDCCH blind detection capability that is allowed to be configured by the SN 2 for the terminal device is less than or equal to the PDCCH blind detection capability that is allowed to be configured by the SN 1 for the terminal device. It may be understood that the fifth information is the capability of the terminal device that is allocated by the SN 1 to the SN 2 and that is available to the SN 2.

Optionally, after S903, the method may further include the following steps.

S905: The SN 1 sends a response to the fourth information to the MN, where the response to the fourth information includes the fourth configuration information, and the fourth configuration information is used by the SN 1 to establish a connection to the terminal device. The response to the fourth information further includes the first index and an identifier of the frequency band selected by the SN 1.

S906: The MN sends the fourth configuration information to the terminal device.

S907: The terminal device sends a response to the fourth configuration information to the MN.

S908: The MN sends the response to the fourth configuration information to the SN 1.

S909: The SN 2 sends a response to the fifth information to the SN 1, where the response to the fifth information includes the fifth configuration information, and the fifth configuration information is used by the SN 2 to establish a connection to the terminal device.

S910: The SN 1 sends the response to the fifth information to the MN.

S911: The MN sends the fifth configuration information to the terminal device.

S912: The terminal device sends a response to the fifth configuration information to the MN.

S913: The MN sends the response to the fifth configuration information to the SN 1. S914: The SN 1 sends the response to the fifth configuration information to the SN 2.

It may be understood that there is no time sequence dependency relationship between S905 to S907 and S908 to S914. For S905 to S914, refer to related descriptions of S507 to S513 in the embodiment shown in FIG. 5. A main difference from the embodiment shown in FIG. 5 lies in that the fifth configuration information sent by the SN 2 to the terminal device needs to be forwarded to the MN via the SN 1, and the response to the fifth configuration information received by the MN needs to be forwarded to the SN 2 via the SN 1.

It may be understood that, in the embodiment shown in FIG. 9, the MN may separately send the fourth configuration information and the fifth configuration information to the terminal device, and the terminal device may separately send the response to the fourth configuration information and the response to the fifth configuration information to the MN.

In addition, the MN may further send, to the terminal device, a message including the fourth configuration information and the fifth configuration information. The terminal device may send, to the MN, a message including the response to the fourth configuration information and the response to the fifth configuration information.

In a first implementation, the MN sends a third RRC message to the terminal device, where the third RRC message is generated by the MN, and the third RRC message includes the fourth configuration information and the fifth configuration information. Further, the terminal device sends a fourth RRC message to the MN, where the fourth RRC message includes the response to the fourth configuration information and the response to the fifth configuration information. For the third RRC message and the fourth RRC message, refer to the foregoing step 450 and step 460.

In a second implementation, the MN sends a fifth RRC message to the terminal device, where the fifth RRC message includes an RRC message (for example, an RRC reconfiguration message) generated by the SN 1 for the terminal device, the RRC message generated by the SN 1 for the terminal device includes the fourth configuration information, the fourth configuration information carries the fifth configuration information, and the MN encapsulates the RRC message generated by the SN 1 for the terminal device, to generate the fifth RRC message. Further, the terminal device sends a sixth RRC message to the MN, where the sixth RRC message includes an RRC message (for example, an RRC reconfiguration complete message) generated by the terminal device for the SN 1, the RRC message generated by the terminal device for the SN 1 includes the response to the fourth configuration information, and the response to the fourth configuration information carries the response to the fifth configuration information. The MN sends, to the SN 1, the RRC message generated by the terminal device for the SN 1.

Optionally, after the SN 1 adds the SN 2 for the terminal device, the SN 1 may send seventh indication information to the MN, where the seventh indication information indicates that the SN 1 successfully adds the SN 2 for the terminal device. Therefore, the MN learns that the SN 1 has configured the SN 2 for the terminal device. For example, the MN does not subsequently trigger a procedure of configuring and adding the SN 2 for the terminal device. When the SN 1 subsequently triggers release of the SN 2, the SN 1 may send eighth indication information to the MN, where the eighth indication information indicates that the SN 2 has been released for the terminal device. Therefore, the MN learns that the SN 2 has been released for the terminal device. For example, the MN may subsequently trigger a procedure of configuring and adding the SN 2 for the terminal device.

In the embodiment shown in FIG. 9, after the MN adds the SN 1, the SN 1 may send an SN addition request to another SN, and the SN 1 further notifies, based on a limitation on the capability of the terminal device configured by the MN for the SN 1, the another SN of the capability of the terminal device that is allowed to be used. Therefore, frequency bands used by the plurality of SNs are different and are in a same frequency band combination, to improve capability configuration efficiency of the terminal device, so that the terminal device can correctly execute configuration information generated by the plurality of SNs for the terminal device, and a procedure of adding an SN is successfully completed. In this way, the terminal device can normally communicate with the plurality of SNs, and communication quality of the terminal device in a multi-connectivity communication process is improved.

According to Case 3 and Case 4, the SN 2 may further request the SN 1 to modify or update the capability of the terminal device corresponding to the SN 2. For example, the SN 2 may request a new capability of the terminal device. For the capability of the terminal device corresponding to the SN 1 and the capability of the terminal device corresponding to the SN 2, refer to related descriptions in the embodiment shown in FIG. 6.

Figure 10:
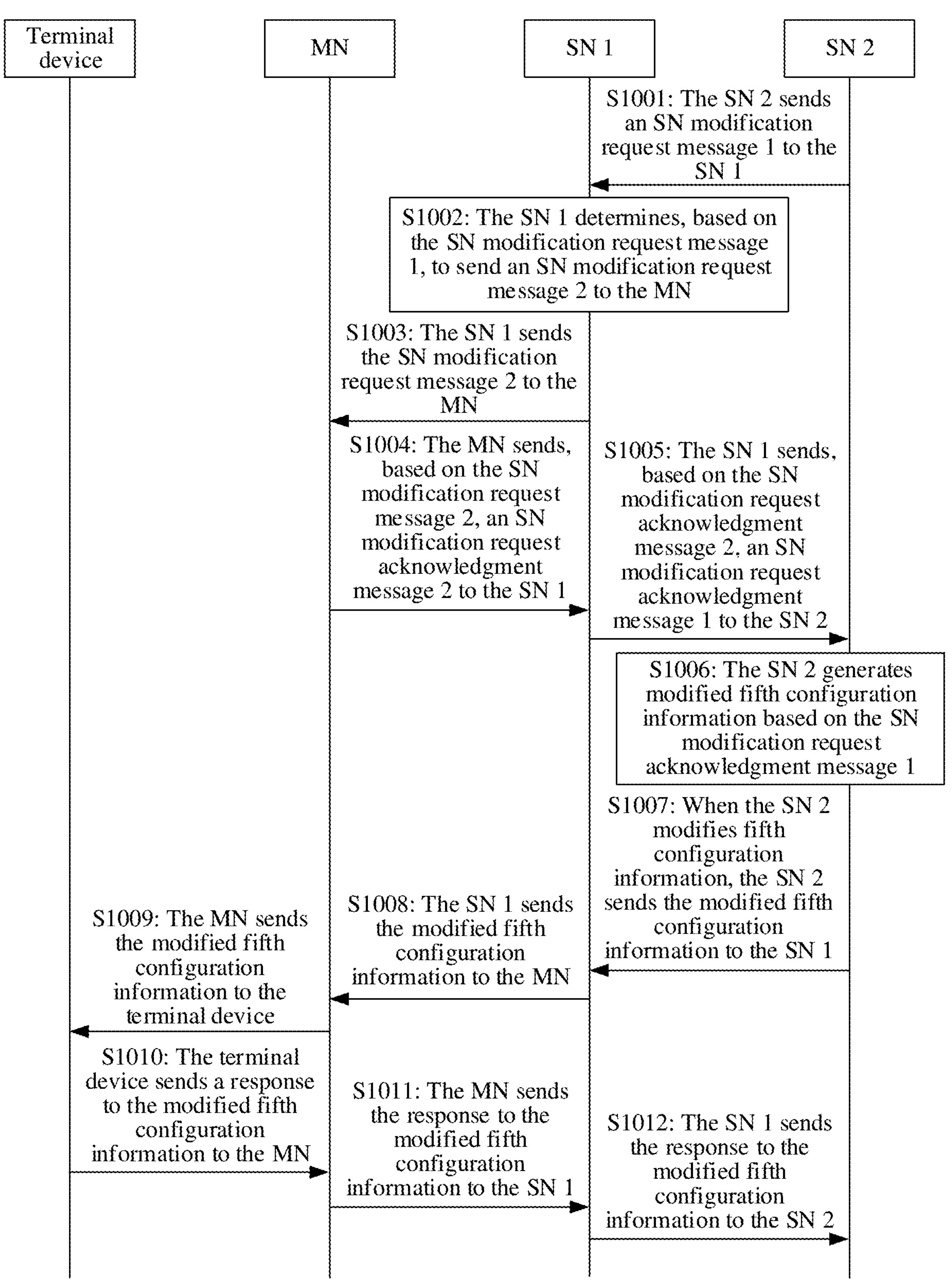
FIG. 10 is a schematic diagram in which an SN 2 requests an SN 1 to modify a capability of a terminal device corresponding to the SN 2 according to an embodiment.

The following uses FIG. 10 as an example to describe a schematic diagram in which an SN 2 requests an SN 1 to modify a capability of a terminal device corresponding to the SN 2. It may be understood that the procedure shown in FIG. 10 is performed after the SN 1 completes the procedure of adding the SN 2, that is, after the procedure shown in FIG. 9.

S1001: The SN 2 sends an SN modification request message 1 to the SN 1, where the SN modification request message 1 is used to request to modify a fifth option, and the fifth option is one or more of capabilities of the terminal device corresponding to the SN 2.

S1002: The SN 1 determines, based on the SN modification request message 1, to send an SN modification request message 2 to the MN.

It may be understood that, when a capability of a terminal device that is associated with the fifth option and that is in the available capability of the terminal device allocated by the MN to the SN 1 in the fourth information cannot meet the capability of the terminal device corresponding to the SN 2 indicated by the fifth option and the capability of the terminal device that is associated with the fifth option and that is in the capability of the terminal device corresponding to the SN 1, the SN 1 may determine, based on the SN modification request message 1, that the SN modification request message 2 needs to be sent to the MN. Alternatively, the SN 1 may modify, based on the SN modification request message 1, the capability of the terminal device that is associated with the fifth option and that is in the capability of the terminal device corresponding to the SN 1.

S1003: The SN 1 sends the SN modification request message 2 to the MN.

For example, the SN modification request message 2 is used to request to modify a sixth option, and the sixth option is the capability of the terminal device that is associated with the fifth option and that is in the available capability of the terminal device allocated by the MN to the SN 1.

For example, the fourth option is a maximum transmit power of the terminal device on the SN 2 side, a maximum transmit power of the terminal device on the SN 2 side is X2, and the maximum transmit power of the terminal device on the SN 1 side is X1, where $X1+X2<Q1$, and Q1 represents the maximum transmit power that is of the terminal device on the SN side and that is allocated by the MN to the SN 1 in the fourth information. The SN 2 sends the SN modification request message 1 to the SN 1, where the SN modification request message 1 is used to request to modify the maximum transmit power of the terminal device on the SN 2 side from X2 to X3, and $X3>X2$.

If $X3+X1<Q1$, the SN 1 does not need the MN to send the SN modification request message 2. The SN 1 may reconfigure the fourth option for the SN 2.

If $X3+X1>Q1$, the SN 1 sends the SN modification request message 2 to the MN, where the SN modification request message 2 is used to request to modify the maximum transmit power that is of the terminal device on the SN side and that is allocated by the MN to the SN 1. In addition, the SN 1 may further modify the maximum transmit power X1 of the terminal device on the SN 1 side to the maximum transmit power X4 of the terminal device on the SN 1 side, so that $X3+X4<Q1$.

S1004: The MN sends, based on the SN modification request message 2, an SN modification request acknowledgment message 2 to the SN 1, where the SN modification request acknowledgment message 2 corresponds to the SN modification request message 2, and the SN modification request acknowledgment message 2 indicates a modified sixth option.

With reference to the foregoing example, the SN modification request acknowledgment message 2 indicates a maximum transmit power Q2 that is of the terminal device on the SN side and that is allocated by the MN to the SN 1, where Q2>Q1.

S1005: The SN 1 sends, based on the SN modification request acknowledgment message 2, an SN modification request acknowledgment message 1 to the SN 2, where the SN modification request acknowledgment message 1 corresponds to the SN modification request message 1, and the SN modification request acknowledgment message 1 is used to acknowledge that the SN 2 uses the third option, or the SN modification request acknowledgment message 1 indicates a modified fourth option.

With reference to the foregoing example, the SN modification request acknowledgment message 1 indicates that the maximum transmit power of the terminal device on the SN 2 side is X3, or the maximum transmit power of the terminal device on the SN 2 side is X5, where X5>X2.

S1006: The SN 2 may generate modified fifth configuration information based on the SN modification request acknowledgment message 1, or the SN 2 may modify the fourth option only based on the SN modification request acknowledgment message 1, without modifying the fifth configuration information.

Herein, reference may be made to S603.

S1007: If the SN 2 generates the modified fifth configuration information, the SN 2 sends the modified fifth configuration information to the SN 1.

S1008: The SN 1 sends the modified fifth configuration information to the MN.

S1009: The MN sends the modified fifth configuration information to the terminal device.

S1010: The terminal device sends a response to the modified fifth configuration information to the MN.

S1011: The MN sends a response to the modified fifth configuration information to the SN 1.

S1012: The SN 1 sends the response to the modified fifth configuration information to the SN 2.

According to the method provided in the embodiment shown in FIG. 10, the SN 2 negotiates, via the SN 1, with the MN on the capability of the terminal device.

According to Case 3 and Case 4, an SN 3 may be added to the SN 1 after the SN 2 is added. Adding of the SN 3 may cause the SN 1 to modify the capability of the terminal device corresponding to the SN 1, or modify the capability of the terminal device corresponding to the SN 1 and the first configuration information. Adding of the SN 3 may further cause the SN 2 to modify the capability of the terminal device corresponding to the SN 2, or modify the capability of the terminal device corresponding to the SN 2 and the second configuration information. Therefore, in this scenario, the SN 1 may modify the capability of the terminal device corresponding to the SN 1 or modify the capability of the terminal device corresponding to the SN 2, so that the available capability of the terminal device allocated by the MN to the SN 1 meets the capability of the terminal device corresponding to the SN 1, the capability of the terminal device corresponding to the SN 2, and the capability of the terminal device corresponding to the SN 3.

Alternatively, the SN 1 may further request the MN to allocate a new available capability of the terminal device to the SN 1, so that the new available capability of the terminal device allocated by the MN to the SN 1 meets the capability of the terminal device corresponding to the SN 1, the capability of the terminal device corresponding to the SN 2, and the capability of the terminal device corresponding to the SN 3.

Figure 11:
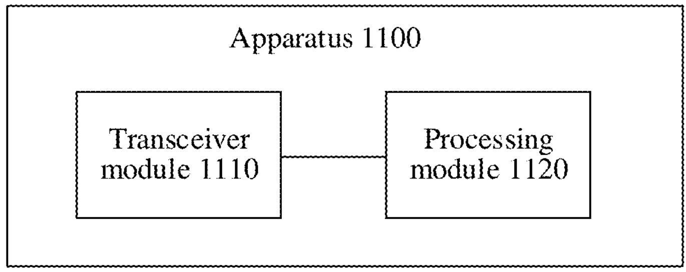
FIG. 11 is a schematic diagram 1 of a structure of an apparatus according to an embodiment.

FIG. 11 is a possible example block diagram of an apparatus according to an embodiment. The apparatus 1100 includes a transceiver module 1110 and a processing module 1120. The transceiver module 1110 may include a receiving unit and a sending unit. The processing module 1120 is configured to control and manage an action of the apparatus 1100. The transceiver module 1110 is configured to support the apparatus 1100 in communicating with another network entity. Optionally, the apparatus 1100 may further include a storage unit, and the storage unit is configured to store program code and data of the apparatus 1100.

Optionally, each module in the apparatus 1100 may be implemented by using software.

Optionally, the processing module 1120 may be a processor or a controller, for example, may be a general-purpose central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor/controller may implement or execute various example logical blocks, modules, and circuits described with reference to content in embodiments. The processor may be a combination of processors implementing a computing function, for example, a combination of one or more microprocessors, or a combination of a DSP and a microprocessor. The transceiver module 1110 may be a communication interface, a transceiver, a transceiver circuit, or the like. The communication interface is a general term. In a specific implementation, the communication interface may include a plurality of interfaces, and the storage unit may be a memory.

When the apparatus 1100 is a master node or a chip in a master node, the processing module 1120 in the apparatus 1100 may support the apparatus 1100 in performing actions of the master node in the foregoing method examples, for example, may support the apparatus 1100 in performing step 400 in FIG. 4, and S501 and S505 in FIG. 5.

The transceiver module 1110 may support communication between the apparatus 1100 and a first secondary node or a second secondary node. For example, the transceiver module 1110 may support the apparatus 1100 in performing step 410, step 420, step 430, step 440, step 450, step 460, step 470, and step 480 in FIG. 4, and S502, S504, S506, S507, S508, S509, S510, S511, S512, and S513 in FIG. 5.

For example, details may be as follows.

In an implementation, the apparatus 1100 includes:

the processing module 1120, configured to determine a first secondary node and a second secondary node; and the transceiver module 1110, configured to: send first information to the first secondary node, where the first information is used by the first secondary node to select a first frequency band, and the first information includes a first index; and send second information to the second secondary node, where the second information is used by the second secondary node to select a second frequency band, and the second information includes the first index.

The first index indicates a first frequency band combination supported by a terminal device, and the first frequency band and the second frequency band are in the first frequency band combination.

In a possible implementation, the transceiver module 1110 is configured to receive a secondary node addition request from the first secondary node, where the secondary node addition request includes an identifier of the second secondary node.

The processing module 1120 is configured to determine the second secondary node based on the identifier of the second secondary node.

In a possible implementation, the first information further includes an identifier of a frequency band available to the first secondary node in the first frequency band combination; the second information further includes an identifier of a frequency band available to the second secondary node in the first frequency band combination; and the frequency band available to the first secondary node in the first frequency band combination does not overlap the frequency band available to the second secondary node in the first frequency band combination.

In a possible implementation, the first information further indicates a first set, and the first set includes a frequency band that is in the first frequency band combination and that has been allocated or pre-allocated to the master node, and a frequency band that is in the first frequency band combination and that has been allocated or pre-allocated to a secondary node other than the first secondary node. The second information further indicates a second set, where the second set includes a frequency band that is in the first frequency band combination and that has been allocated or pre-allocated to the master node, and a frequency band that is in the first frequency band combination and that has been allocated or pre-allocated to a secondary node other than the second secondary node.

In a possible implementation, the first information includes indexes respectively corresponding to at least one frequency band combination supported by the terminal device, and the indexes respectively corresponding to the at least one frequency band combination include the first index.

The transceiver module 1110 is configured to: receive the first index from the first secondary node; and send the second information to the second secondary node, where the second information includes the first index and an identifier of a frequency band available to the second secondary node in the first frequency band combination.

In a possible implementation, the first information includes indexes respectively corresponding to at least one frequency band combination supported by the terminal device, and the indexes respectively corresponding to the at least one frequency band combination include the first index.

The transceiver module 1110 is configured to: receive, from the first secondary node, the first index and an identifier of the first frequency band; and send the second information to the second secondary node, where the second information includes the first index, an identifier of a frequency band selected by the master node from the first frequency band combination, and the identifier of the first frequency band.

It should be understood that the apparatus 1100 according to this embodiment may correspond to the master node in the foregoing method embodiments, and operations and/or functions of modules in the apparatus 1100 are respectively used to implement corresponding steps of the methods of the master node in the foregoing method embodiments. Therefore, beneficial effects in the foregoing method embodiments can also be implemented. For brevity, details are not described herein again.

Figure 12:
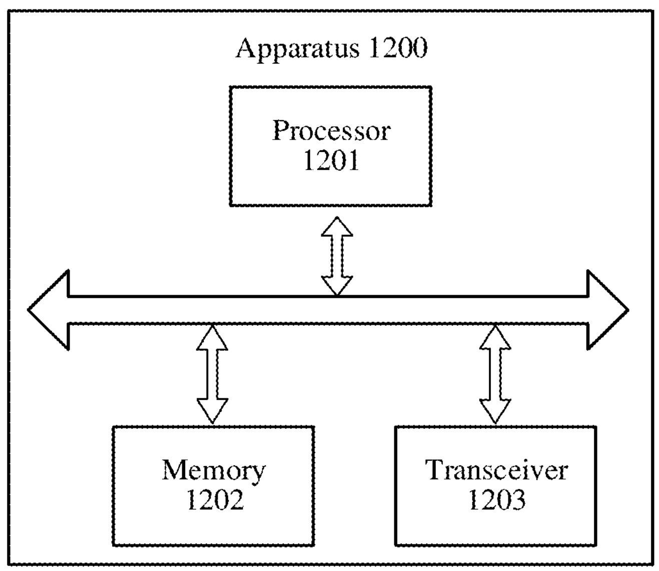
FIG. 12 is a schematic diagram 2 of a structure of an apparatus according to an embodiment.

FIG. 12 is a schematic diagram of a structure of a communication apparatus 1200 according to an embodiment. As shown in FIG. 12, the apparatus 1200 includes a processor 1201.

When the apparatus 1200 is a master node or a chip in a master node, in a possible implementation, the processor 1201 is configured to invoke an interface to perform the following actions:

determine a first secondary node and a second secondary node; send first information to the first secondary node, where the first information is used by the first secondary node to select a first frequency band, and the first information includes a first index; and send second information to the second secondary node, where the second information is used by the second secondary node to select a second frequency band, the second information includes the first index, the first index indicates a first frequency band combination supported by a terminal device, and the first frequency band and the second frequency band are in a first frequency band combination.

It should be understood that the apparatus 1200 may be further configured to perform another step and/or operation on the master node side in the foregoing embodiments. For brevity, details are not described herein again.

It should be understood that the processor 1201 may invoke the interface to perform the foregoing receiving and sending actions. The invoked interface may be a logical interface or a physical interface. This is not limited. Optionally, the physical interface may be implemented by using a transceiver. Optionally, the apparatus 1200 further includes a transceiver 1203.

Optionally, the apparatus 1200 further includes a memory 1202. The memory 1202 may store program code in the foregoing method embodiments, so that the processor 1201 invokes the program code.

For example, if the apparatus 1200 includes the processor 1201, the memory 1202, and the transceiver 1203, the processor 1201, the memory 1202, and the transceiver 1203 communicate with each other via an internal connection path, to transfer a control signal and/or a data signal. In a possible implementation, the processor 1201, the memory 1202, and the transceiver 1203 may be implemented by using a chip, and the processor 1201, the memory 1202, and the transceiver 1203 may be implemented in a same chip, or may be separately implemented in different chips, or functions of any two of the processor 1201, the memory 1202, and the transceiver 1203 are implemented in one chip. The memory 1202 may store program code, and the processor 1201 invokes the program code stored in the memory 1202, to implement a corresponding function of the apparatus 1200.

The method in the foregoing embodiment may be applied to the processor, or may be implemented by the processor. The processor may be an integrated circuit chip and has a signal processing capability. In an implementation process, steps in the foregoing method embodiments can be implemented by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware assembly, or a system on chip (SoC), a central processing unit (CPU), a network processor (NP), a digital signal processor (DSP), a micro controller unit (MCU), or a programmable logic device (PLD) or another integrated chip. It may implement or perform the methods, the steps, and logical block diagrams that are in embodiments. The general-purpose processor may be a microprocessor, or the processor may be any conventional processor or the like. The steps in the methods with reference to embodiments may be directly performed and completed by a hardware decoding processor, or may be performed and completed by using a combination of hardware in the decoding processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in this embodiment may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described includes, but is not limited to, these and any memory of another proper type.

It should be understood that in embodiments, numbers "first", "second", and the like are merely used to distinguish between different objects, for example, to distinguish between different parameter information or messages, and do not constitute a limitation on the scope of embodiments. Embodiments are not limited thereto.

It should be further understood that sequence numbers of the foregoing processes do not mean execution sequences in embodiments. The execution sequences of the processes should be determined based on functions and internal logic of the processes. Various numerical numbers or sequence numbers involved in the foregoing processes are merely distinguished for ease of description, and should not constitute any limitation on the implementation processes of embodiments.

Mutual reference may be made to content in embodiments. Unless otherwise specified or a logical conflict occurs, terms and/or descriptions in different embodiments are consistent and may be referenced by each other. Features in different embodiments may be combined to form a new embodiment based on an internal logical relationship.

It should also be understood that the term "and/or" describes only an association relationship for describing associated objects and represents that three relationships may exist. For example, A and/or B may indicate the following three cases: only A exists, both A and B exist, and only B exists. In addition, the character "/" generally indicates an "or" relationship between the associated objects.

Unless otherwise specified, an expression used in the embodiments similar to an expression that "an item includes one or more of the following: A, B, and C" can mean that the item may be any one of the following: A; B; C; A and B; A and C; B and C; A, B, and C; A and A; A, A, and A; A, A, and B; A, A, and C; A, B, and B; A, C, and C; B and B; B, B, and B; B, B, and C; C and C; C, C, and C; and another combination of A, B, and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

A person of ordinary skill in the art may be aware that, in combination with the examples described in embodiments, units and algorithm steps may be implemented by electronic hardware or a combination of computer software and electronic hardware. Whether the functions are performed by hardware or software depends on particular applications and design constraint conditions of the solutions. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided, it should be understood that the system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in embodiments.

In addition, functional units in embodiments of the embodiments may be integrated into one processing unit, each of the units may exist alone physically, or two or more units are integrated into one unit.

When the functions are implemented in the form of a software functional unit and sold or used as an independent product, the functions may be stored in a non-transitory computer-readable storage medium. Based on such an understanding, the solutions of the embodiments essentially, or the part contributing to the conventional technology, or some of the solutions may be implemented in a form of a software product. The computer software product is stored in a non-transitory storage medium, and includes several instructions for instructing a computer device (which may be a personal computer, a server, or a network device) to perform all or some of the steps of the methods described in embodiments. The foregoing storage medium includes any medium that can store program code, such as a USB flash drive, a removable hard disk drive, a read-only memory ROM, a random access memory RAM, a magnetic disk, or an optical disc.

What is claimed is:

1. A method, comprising:

determining, by a master node, a first secondary node and a second secondary node;

sending, by the master node, first information to the first secondary node, wherein the first information is used by the first secondary node to select a first frequency band, and the first information comprises a first index; and sending, by the master node, second information to the second secondary node, wherein the second information is used by the second secondary node to select a second frequency band, and the second information comprises the first index, wherein the first index indicates a first frequency band combination supported by a terminal device, and the first frequency band and the second frequency band are in the first frequency band combination.

2. The method according to claim 1, further comprising:

receiving, by the master node, a secondary node addition request from the first secondary node, wherein the secondary node addition request comprises an identifier of the second secondary node; and determining, by the master node, the second secondary node based on the identifier of the second secondary node.

3. The method according to claim 1, wherein the first information further comprises an identifier of a frequency band available to the first secondary node in the first frequency band combination;

the second information further comprises an identifier of a frequency band available to the second secondary node in the first frequency band combination; and the frequency band available to the first secondary node in the first frequency band combination does not overlap the frequency band available to the second secondary node in the first frequency band combination.

4. The method according to claim 1, wherein the first information further indicates a first set, and the first set comprises a frequency band that is in the first frequency band combination and that has been allocated or pre-allocated to the master node, and a frequency band that is in the first frequency band combination and that has been allocated or pre-allocated to a secondary node other than the first secondary node;

the second information further indicates a second set, wherein the second set comprises a frequency band that is in the first frequency band combination and that has been allocated or pre-allocated to the master node, and a frequency band that is in the first frequency band combination and that has been allocated or pre-allocated to a secondary node other than the second secondary node; and the first set does not overlap the second set.

5. The method according to claim 1, wherein the first information comprises indexes respectively corresponding to at least one frequency band combination supported by the terminal device, and the indexes respectively corresponding to the at least one frequency band combination comprise the first index; and the method further comprises:

receiving, by the master node, the first index from the first secondary node; and sending, by the master node, the second information to the second secondary node, comprises:

sending, by the master node, the second information to the second secondary node, wherein the second information comprises the first index and an identifier of a frequency band available to the second secondary node in the first frequency band combination.

6. The method according to claim 1, wherein the first information comprises indexes respectively corresponding to at least one frequency band combination supported by the terminal device, and the indexes respectively corresponding to the at least one frequency band combination comprise the first index; and the method further comprises:

receiving, by the master node from the first secondary node, the first index and an identifier of the first frequency band; and sending, by the master node, the second information to the second secondary node comprises:

sending, by the master node, the second information to the second secondary node, wherein the second information comprises the first index, an identifier of a frequency band selected by the master node from the first frequency band combination, and the identifier of the first frequency band.

7. The method according to claim 1, further comprising:

receiving, by the master node, a response to the first information from the first secondary node, wherein the response to the first information comprises first configuration information, and the first configuration information is used by the first secondary node to establish a connection to the terminal device;

receiving, by the master node, a response to the second information from the second secondary node, wherein the response to the second information comprises second configuration information, and the second configuration information is used by the second secondary node to establish a connection to the terminal device;

sending, by the master node, the first configuration information and the second configuration information to the terminal device;

receiving, by the master node from the terminal device, a response to the first configuration information and a response to the second configuration information; and sending, by the master node, the response to the first configuration information to the first secondary node, and sending, by the master node, the response to the second configuration information to the second secondary node.

8. A data transmission apparatus, wherein the apparatus comprises one or more processors to run instructions cause the apparatus to:

determine a first secondary node and a second secondary node;

send first information to the first secondary node, wherein the first information is used by the first secondary node to select a first frequency band, and the first information comprises a first index; and send second information to the second secondary node, wherein the second information is used by the second secondary node to select a second frequency band, and the second information comprises the first index, wherein the first index indicates a first frequency band combination supported by a terminal device, and the first frequency band and the second frequency band are in the first frequency band combination.

9. The apparatus according to claim 8, wherein the apparatus is further caused to:

receive a secondary node addition request from the first secondary node, wherein the secondary node addition request comprises an identifier of the second secondary node; and determine the second secondary node based on the identifier of the second secondary node.

10. The apparatus according to claim 8, wherein the first information further comprises an identifier of a frequency band available to the first secondary node in the first frequency band combination;

the second information further comprises an identifier of a frequency band available to the second secondary node in the first frequency band combination; and the frequency band available to the first secondary node in the first frequency band combination does not overlap the frequency band available to the second secondary node in the first frequency band combination.

11. The apparatus according to claim 8, wherein the first information further indicates a first set, and the first set comprises a frequency band that is in the first frequency band combination and that has been allocated or pre-allocated to a master node, and a frequency band that is in the first frequency band combination and that has been allocated or pre-allocated to a secondary node other than the first secondary node;

the second information further indicates a second set, wherein the second set comprises a frequency band that is in the first frequency band combination and that has been allocated or pre-allocated to the master node, and a frequency band that is in the first frequency band combination and that has been allocated or pre-allocated to a secondary node other than the second secondary node; and the first set does not overlap the second set.

12. The apparatus according to claim 8, wherein the first information comprises indexes respectively corresponding to at least one frequency band combination supported by the terminal device, and the indexes respectively corresponding to the at least one frequency band combination comprise the first index; and the apparatus is further caused to:

receive the first index from the first secondary node; and the sending of second information to the second secondary node comprises:

send the second information to the second secondary node, wherein the second information comprises the first index and an identifier of a frequency band available to the second secondary node in the first frequency band combination.

13. The apparatus according to claim 8, wherein the first information comprises indexes respectively corresponding to at least one frequency band combination supported by the terminal device, and the indexes respectively corresponding to the at least one frequency band combination comprise the first index; and the apparatus is further caused to:

receive the first index and an identifier of the first frequency band from the first secondary node; and the sending of second information to the second secondary node comprises:

send the second information to the second secondary node, wherein the second information comprises the first index, an identifier of a frequency band selected by the master node from the first frequency band combination, and the identifier of the first frequency band.

14. The apparatus according to claim 8, wherein the apparatus is further caused to:

receive a response to the first information from the first secondary node, wherein the response to the first information comprises first configuration information, and the first configuration information is used by the first secondary node to establish a connection to the terminal device;

receive a response to the second information from the second secondary node, wherein the response to the second information comprises second configuration information, and the second configuration information is used by the second secondary node to establish a connection to the terminal device;

send the first configuration information and the second configuration information to the terminal device;

receive a response to the first configuration information and a response to the second configuration information from the terminal device; and send the response to the first configuration information to the first secondary node, and send, by the master node, the response to the second configuration information to the second secondary node.

15. A non-transitory computer readable medium storing instructions that are executable by a computer, the non-transitory computer readable medium is applied to a first communication apparatus, and the instructions comprise instructions for:

determining a first secondary node and a second secondary node;

sending first information to the first secondary node, wherein the first information is used by the first secondary node to select a first frequency band, and the first information comprises a first index; and sending second information to the second secondary node, wherein the second information is used by the second secondary node to select a second frequency band, and the second information comprises the first index, wherein the first index indicates a first frequency band combination supported by a terminal device, and the first frequency band and the second frequency band are in the first frequency band combination.

16. The non-transitory computer readable medium according to claim 15, wherein the instructions further comprise instructions for:

receiving a secondary node addition request from the first secondary node, wherein the secondary node addition request comprises an identifier of the second secondary node; and determining the second secondary node based on the identifier of the second secondary node.

17. The non-transitory computer readable medium according to claim 15, wherein the first information further comprises an identifier of a frequency band available to the first secondary node in the first frequency band combination;

the second information further comprises an identifier of a frequency band available to the second secondary node in the first frequency band combination; and the frequency band available to the first secondary node in the first frequency band combination does not overlap the frequency band available to the second secondary node in the first frequency band combination.

18. The non-transitory computer readable medium according to claim 15, wherein the first information further indicates a first set, and the first set comprises a frequency band that is in the first frequency band combination and that has been allocated or pre-allocated to a master node, and a frequency band that is in the first frequency band combination and that has been allocated or pre-allocated to a secondary node other than the first secondary node;

the second information further indicates a second set, wherein the second set comprises a frequency band that is in the first frequency band combination and that has been allocated or pre-allocated to the master node, and a frequency band that is in the first frequency band combination and that has been allocated or pre-allocated to a secondary node other than the second secondary node; and the first set does not overlap the second set.

19. The non-transitory computer readable medium according to claim 15, wherein the first information comprises indexes respectively corresponding to at least one frequency band combination supported by the terminal device, and the indexes respectively corresponding to the at least one frequency band combination comprise the first index;

the instructions further comprise instructions for:

receiving the first index from the first secondary node; and the sending of the second information to the second secondary node comprises:

sending the second information to the second secondary node, wherein the second information comprises the first index and an identifier of a frequency band available to the second secondary node in the first frequency band combination.

20. The non-transitory computer readable medium according to claim 15, wherein the first information comprises indexes respectively corresponding to at least one frequency band combination supported by the terminal device, and the indexes respectively corresponding to the at least one frequency band combination comprise the first index;

the instructions further comprise instructions for:

receiving the first index and an identifier of the first frequency band from the first secondary node; and the sending of the second information to the second secondary node comprises:

sending the second information to the second secondary node, wherein the second information comprises the first index, an identifier of a frequency band selected by the master node from the first frequency band combination, and the identifier of the first frequency band.

* * * * *